US012719384B2

(12) United States Patent
Szlafsztein et al.

(10) Patent No.: US 12,719,384 B2
(45) Date of Patent: Aug. 25, 2026

(54) SYSTEM AND METHODS FOR OPERATING A POWER CONVERTER AT VARYING POWER PRODUCTION CONDITIONS

(71) Applicant: Solaredge Technologies Ltd., Herzeliya (IL)

(72) Inventors: Omer Szlafsztein, Dafna (IL); Amir Peri, Kochav Yair (IL); Tom Di Cori, Tel Aviv (IL); Ohad Fried, Ra'anana (IL)

(73) Assignee: Solaredge Technologies Ltd., Herzeliya (IL)

( * ) Notice: Subject to any disclaimer, the term of this patent is extended or adjusted under 35 U.S.C. 154(b) by 328 days.

(21) Appl. No.: 18/536,491

(22) Filed: Dec. 12, 2023

(65) Prior Publication Data

US 2024/0204683 A1 Jun. 20, 2024

Related U.S. Application Data

(60) Provisional application No. 63/432,427, filed on Dec. 14, 2022.

(51) Int. Cl.

| | |
|---|---|
| ***H02M 7/483*** | (2007.01) |
| ***H02M 1/00*** | (2006.01) |
| ***H02M 7/537*** | (2006.01) |

(52) U.S. Cl.
CPC ......... *H02M 7/483* (2013.01); *H02M 1/0009* (2021.05); *H02M 7/537* (2013.01)

(58) Field of Classification Search
CPC ..... H02M 7/483; H02M 1/0009; H02M 7/537
See application file for complete search history.

(56) References Cited

U.S. PATENT DOCUMENTS

| | | | | |
|---|---|---|---|---|
| 7,492,134 | B2 | 2/2009 | Tang et al. | |
| 7,701,357 | B2 | 4/2010 | Deaver, Sr. et al. | |
| 9,369,062 | B2 | 6/2016 | Wachenfeld et al. | |
| 9,473,044 | B2 | 10/2016 | Somani et al. | |
| 9,865,410 | B2 | 1/2018 | Mousavi et al. | |
| 9,906,037 | B2 | 2/2018 | Rogers | |
| 11,545,892 | B2 * | 1/2023 | Hafezinasab | H02M 3/335 |
| 12,176,740 | B2 * | 12/2024 | Zohar | H02J 7/0024 |

(Continued)

FOREIGN PATENT DOCUMENTS

| | | |
|---|---|---|
| EP | 2924839 B1 | 9/2016 |
| EP | 2668705 B3 | 8/2019 |

OTHER PUBLICATIONS

Cousineau, M. et al., "Decentralized Phase Shedding with Low Power Mode for Multiphase Converter," Energies 2021, 14, 6748, Oct. 16, 2021.

(Continued)

*Primary Examiner* — Adolf D Berhane
(74) *Attorney, Agent, or Firm* — Banner & Witcoff, Ltd.

(57) ABSTRACT

In case the operational power production level of a multi-phase DC-AC power converter decreases, a controller may be configured to determine that a switching leg or switching legs of DC-AC power converter are to be disabled based on a power criterion to reduce losses incurred by the DC-AC power converter. The controller may be configured to select one of more of the switching legs, based on a selection criterion, and disable the selected switching leg or switching legs so as to reduce phase imbalance or degradation of the switching legs.

17 Claims, 18 Drawing Sheets

(56) References Cited

U.S. PATENT DOCUMENTS

| | | | | |
|---|---|---|---|---|
| 2011/0179299 | A1 | 7/2011 | Piwonka et al. | |
| 2013/0279228 | A1 | 10/2013 | Zhu et al. | |
| 2021/0257909 | A1 | 8/2021 | Roessig et al. | |
| 2025/0074226 | A1* | 3/2025 | Ham | B60L 50/51 |
| 2025/0293614 | A1* | 9/2025 | Haryani | H02M 1/4216 |

OTHER PUBLICATIONS

Ismail, A. G. et al., “Enhancement of Electrical Distribution Networks Performance Using the Load Management Methodology,” Energy Reports 6 (2020), 2066-2074, Aug. 12, 2020.

Manez, T. et al., “High Efficiency Non-isolated Three Port DC-DC Converter for PV-Battery Systems,” Proceedings of the 2016 8th International Power Electronics and Motion Control Conference IEEE, May 22-26, 2016.

Tayebi S. Milad et al; “Dynamic dead-time optimization and phase skipping control techniques for three-phase microinverter applications”; IEEE Transactions on Industrial Electronics, vol. 63, No. 12.

Tayebi S. Milad et al; “Implementing Synchronous DC Link Voltage Control with Phase Skipping on a Three-Phase Microinverter Using Minimum DC Link Capacitance”; 2017 IEEE Energy Conversion Congress and Exposition.

Apr. 29, 2024—European Search Report—EP App. No. 23216240.4.

* cited by examiner

SYSTEM AND METHODS FOR OPERATING A POWER CONVERTER AT VARYING POWER PRODUCTION CONDITIONS

CROSS-REFERENCE TO RELATED APPLICATIONS

The present application claims priority to U.S. provisional patent application Ser. No. 63/432,427, filed Dec. 14, 2022, hereby incorporated by reference as to its entirety.

FIELD OF THE DISCLOSURE

The disclosure relates generally to power systems. More specifically, the disclosure provides a system and method for operating a power converter connected to a varying source and/or a varying load.

BACKGROUND OF THE DISCLOSURE

Power systems may use a direct current (DC) to alternating current (AC) power converter (DC-AC power converter), to convert DC power from a power source (e.g., a photovoltaic panel, a photovoltaic string, a photovoltaic array, a battery, a supercapacitor, a fuel cell, a wind turbine), to AC power, or vice versa. The DC-AC power converter may be a three phase (3-phase) DC-AC power converter. When in operation, a DC-AC power converter may convert DC power to produce AC power (or vice versa) at an operational power production level. An operational power production level of a DC-AC power converter may relate to the ratio between the maximum output power, and the actual output power the DC-AC power converter provides (e.g., between 0% to 100%). In some cases, a DC-AC power converter may operate at an operational power production level of less than 100%. For example, in case the load does not draw the maximum power from the DC-AC power converter may provide, or in case the power source provides less power than the maximum capacity of the DC-AC power converter (e.g., there is no light in case photovoltaic panels are used, the battery is depleted, there is no wind in case a wind turbine is used).

The efficiency of a DC-AC power converter (e.g., the ratio between output power and input power) may relate to the operational power production level of the DC-AC power converter. For example, in some cases, the DC-AC power converter may produce power at less than 100% capacity. However, the DC-AC power converter may still operate so as to be able to provide output power relating to a capacity of 100%. For example, in a photovoltaic power system, during the day, the available power from the photovoltaic modules may be higher than the power consumed by the load (e.g., a home, a warehouse). In such cases, the DC-AC power converter may still operate so as to be able to provide the maximum power to the load, even if the load does not require the maximum power. In such cases, the efficiency of the DC-AC power converter may reduce.

BRIEF SUMMARY OF THE DISCLOSURE

The following presents a simplified summary of the disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

According to some aspects of the disclosure, a DC-AC power converter may comprise three or more switching legs. In some cases, an operational power production level of the DC-AC power converter may decrease (e.g., as a result of the load not drawing the maximum available power from the DC-AC power converter, or as a result of the power source providing less power than the maximum capacity of the DC-AC power converter, or otherwise providing power that has reduced in comparison with a previous amount of power or that has dropped below a threshold amount of power). Such reduced power consumption by the load, or reduced power received from the DC power source, or reduced operational power production level by the DC-AC power converter, may be examples of a power criterion. Based on a power criterion (e.g., output power, input power, and/or operational power production level), a controller may be configured to determine that a switching leg or multiple switching legs of the DC-AC power converter are to be disabled. The controller may be configured to select, based on a selection criterion, one of more of the switching legs, and to disable the selected one or more switching legs. The selection criterion may be, for example, a random selection, a predetermined sequence, or based on signals from other systems or from a power company. Thus, any losses (e.g., switching losses or conduction losses) that would otherwise be incurred by the operation of the selected switching leg or switching legs may be reduced or even eliminated, even in cases in which the operational power production level of the power converter has decreased.

According to some aspects of the disclosure, losses of a DC-AC power converter may be reduced. For example, based on a measured electrical characteristic (for example a power consumption of a load connected to the DC-AC power converter and/or a power produced by a power source or an energy storage), one or more switching legs of the DC-AC power converter may be selected. The selected one or more switching legs may be disabled so as not to provide power to the load. For example, the selected one or more switching legs may be disabled by disconnecting the selected one or more switching legs from the power source and/or from the load.

BRIEF DESCRIPTION OF THE DRAWINGS

A more complete understanding of the present disclosure and example potential advantages thereof may be acquired by referring to the following description in consideration of the accompanying drawings, in which like reference numbers indicate like features, and wherein:

FIG. 5 illustrates an example system in which a plurality of power systems may communicated there between;

DETAILED DESCRIPTION OF THE DISCLOSURE

In the following disclosure of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope of the present disclosure. For example, the term "connected" herein may refer to directly connected or indirectly connected.

According to the disclosure herein, a multi-phase DC-AC power converter, such as a 3-phase DC-AC power converter, may operate under conditions of varying power production conditions. For example, a 3-phase DC-AC power converter may comprise three switching legs, each corresponding to a respective different phase (e.g., of a 3-phase power delivery network). The switching legs may be connected to DC power received from a DC power source. Each switching leg may be configured to convert the DC power to AC power at a corresponding one of the phases. According to the disclosure herein, based on a power criterion (for example, where the operational power production level of the DC-AC power converter is determined to decrease such as below a threshold amount of received DC power and/or below a threshold amount of output AC power to a load), a controller may be configured to determine that a switching leg or switching legs of the DC-AC power converter that are to be disabled, and disable the selected switching leg or switching legs. By disabling the selected one or more switching legs, any losses (e.g., switching losses or conduction losses) that may otherwise be incurred by the operation of the selected switching leg or legs may be reduced or even eliminated, even in cases in which the operational power production level of the power converter has decreased. Moreover, disabling the selected one or more switching legs may reduce the degradation of one or more of the switching legs. The controller may be configured to select the one of more of the switching legs based on a selection criterion, and to disable the selected switching leg or switching legs (e.g., so as to reduce phase imbalance). When a power criterion that cause one or more switching legs to be disabled is no longer met (for example, the received DC power rises above a DC power threshold or the output AC power rises above an AC power threshold), then based on this the controller may cause one or more of the switching legs that were previously disabled to be re-enabled. The applicant conducted studies on improvement of the efficiency of disabling one or more switching legs. According to these studies disabling one or more switching legs may result in 35% less losses.

Figure 1A:
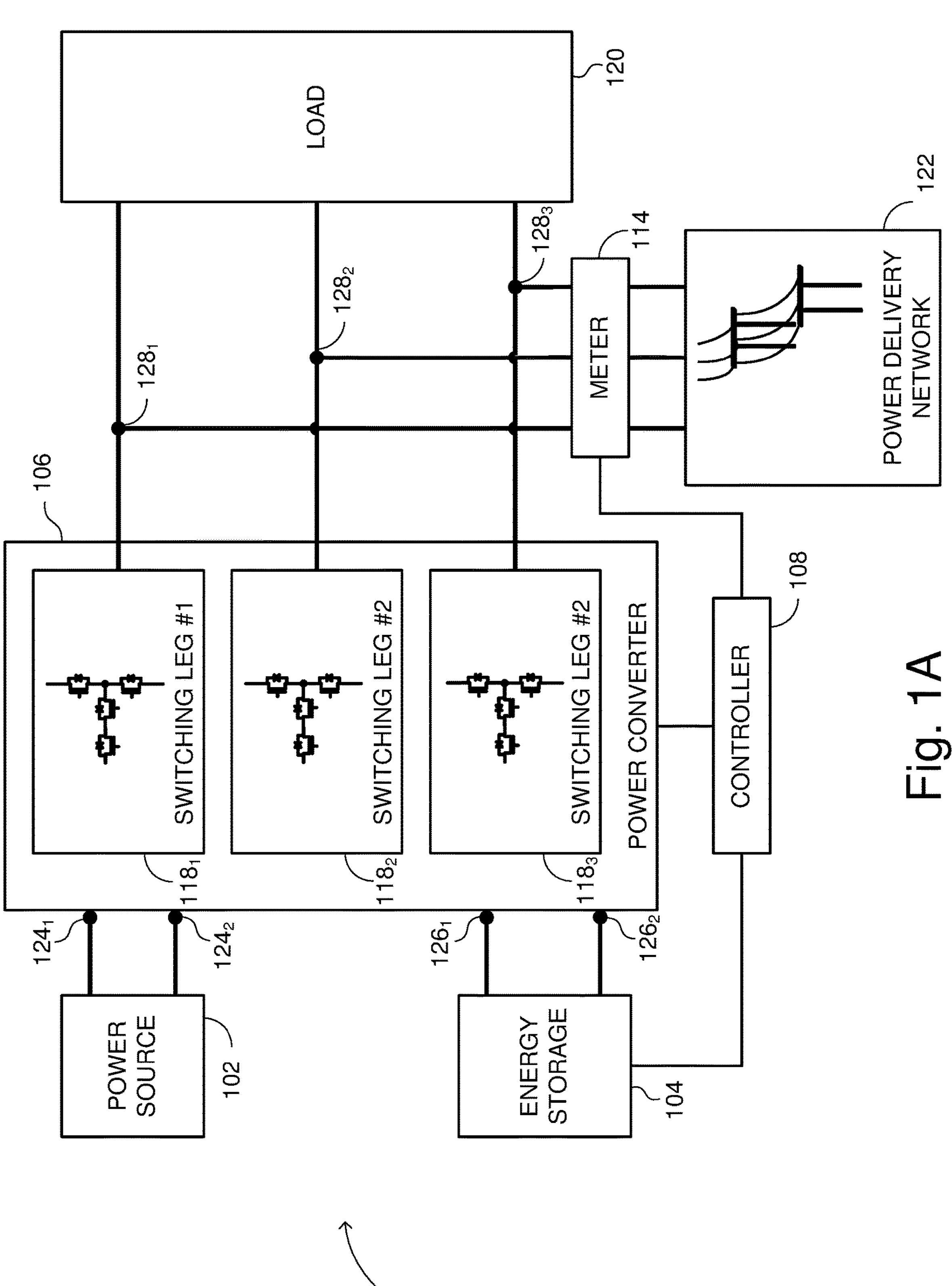
FIG. 1A illustrates an example power system in accordance with aspects of the disclosure herein in which all switching legs are enabled.
Figure 1B:
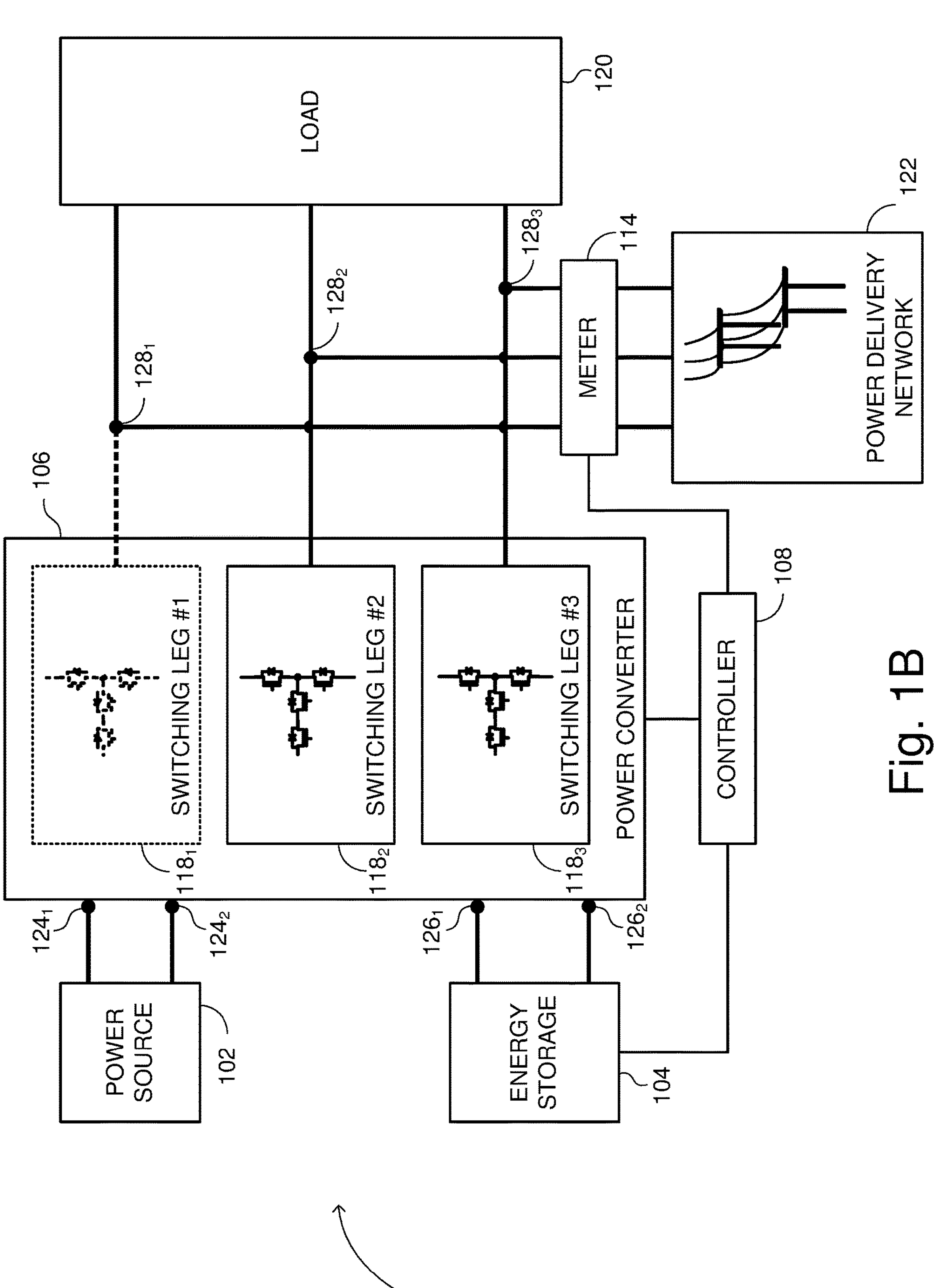
FIG. 1B illustrates the power system of FIG. 1A in accordance with aspects of the disclosure herein in which one switching legs is disabled.
Figure 1C:
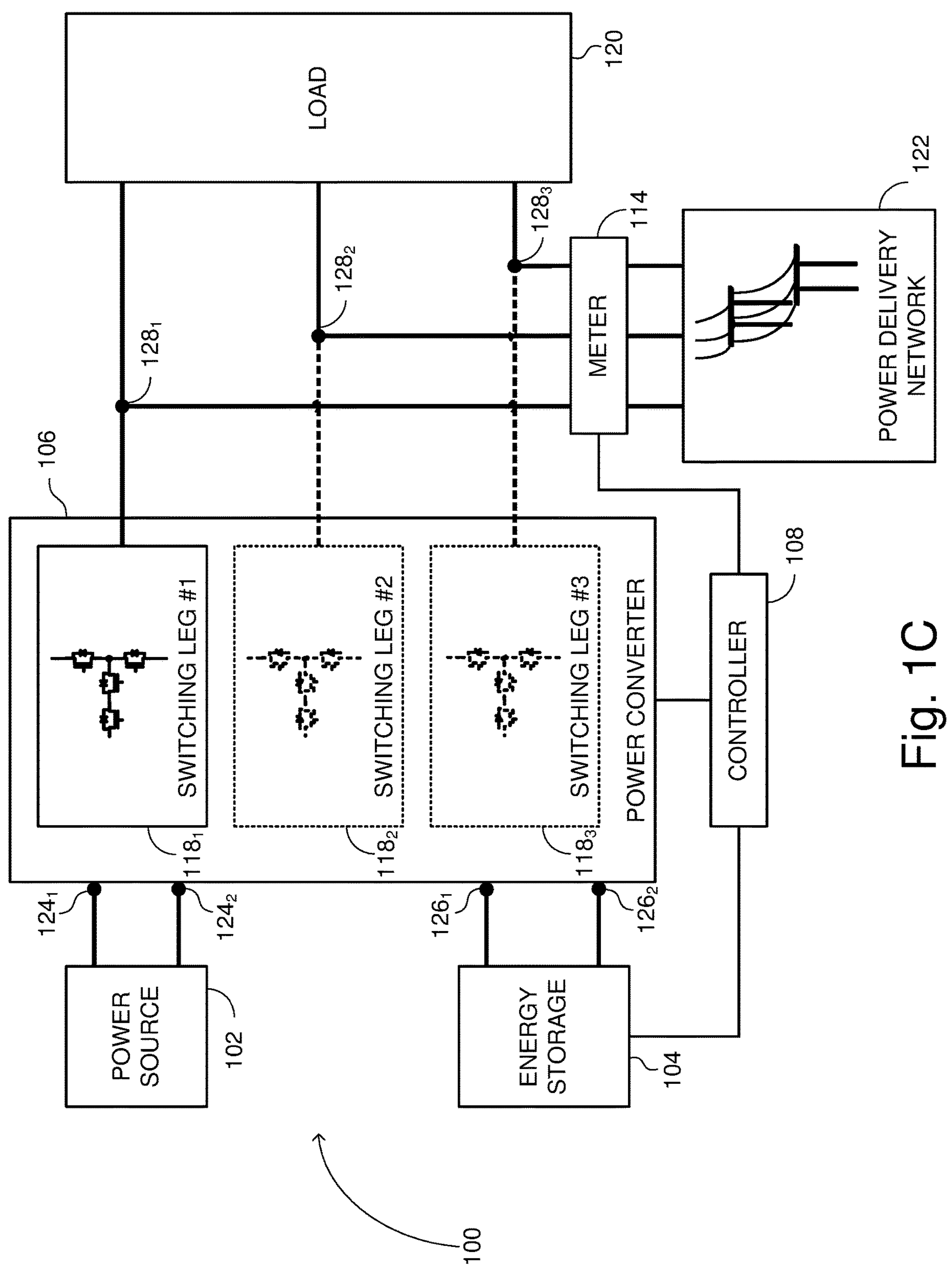
FIG. 1C illustrates the power system of FIG. 1A in accordance with aspects of the disclosure herein in which two switching legs are disabled.
Figure 1D:
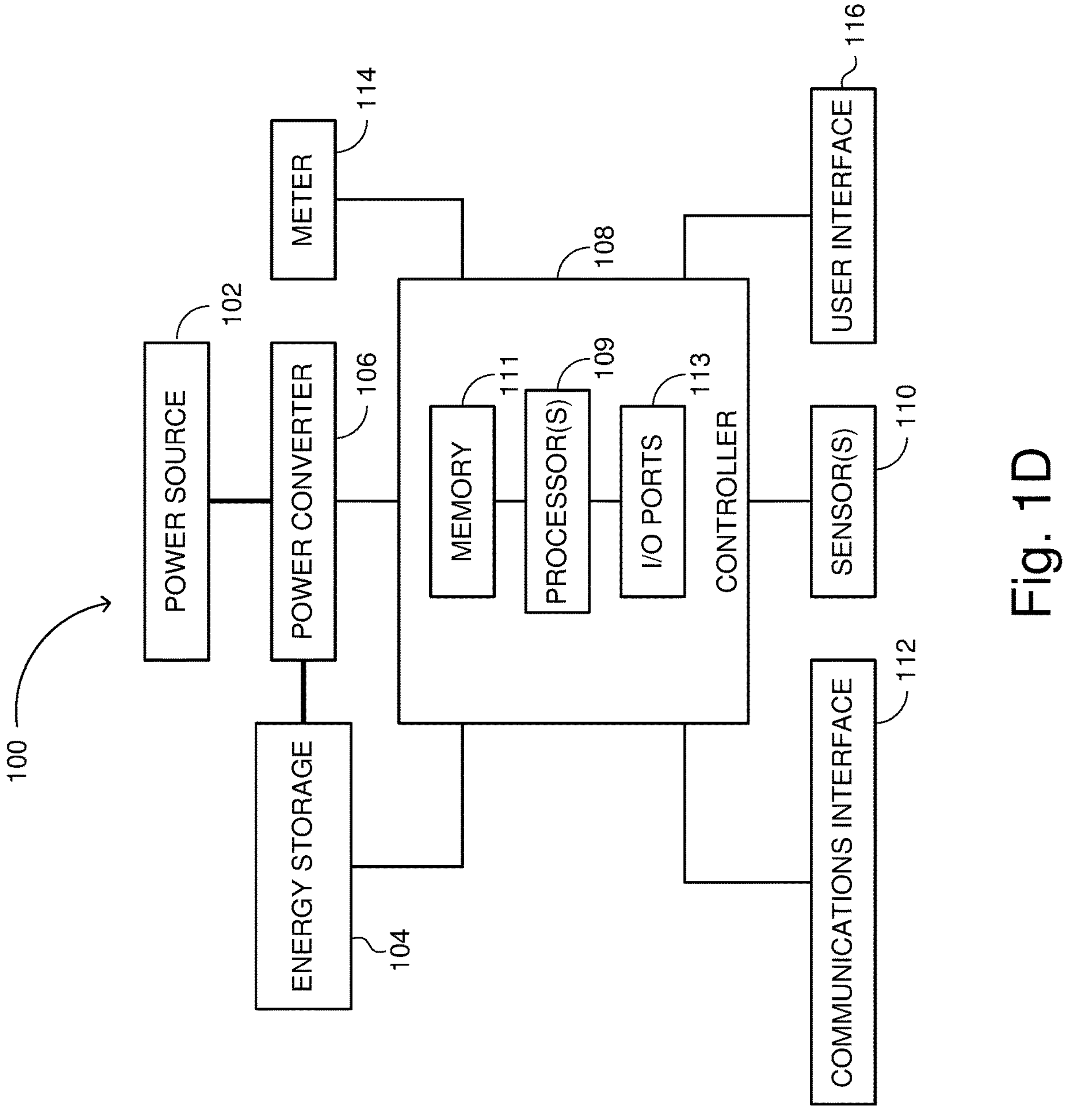
FIG. 1D illustrates a block diagram of the power system of FIG. 1A in accordance with aspects of the disclosure herein.

Reference is made to FIGS. 1A, 1B, 1C, and ID, which illustrate an example power system, generally referenced 100, in accordance with aspects of the disclosure herein. Power system 100 may comprise a power source 102, energy storage 104, a power converter 106, and/or a controller 108. Power system 100 may further comprise sensor (s) 110, communications 112, a meter 114, and/or a user interface 116 such as one or more buttons, switches, displays, indicator lights, and/or speakers. Power converter 106 may comprise three or more switching legs, for example three switching legs $\mathbf{118}_1$, $\mathbf{118}_2$, and $\mathbf{118}_3$. It is noted that while communications 112, sensors(s) 110, and user interface 116 are depicted in FIG. 1D only, these elements may nevertheless be included in the system 100 as shown in FIGS. 1A, 1B, and 1C and are not depicted in those figures merely for the sake of the clarity.

Power source 102 may be connected to power converter 106 at a plurality of DC terminals, such as first DC terminals $\mathbf{124}_1$ and $\mathbf{124}_2$. Energy storage 104 may be connected to power converter 106 at second DC terminals $\mathbf{126}_1$ and $\mathbf{126}_2$. Controller 108 may be connected to power converter 106, energy storage 104, sensor(s) 110, and communications 112. Controller 108 may be connected to meter 114 and user interface 116 (e.g., either directly or via a communication link). Each one of switching legs $\mathbf{118}_1$, $\mathbf{118}_2$, and $\mathbf{118}_3$ may be connected to a respective one of AC terminals $\mathbf{128}_1$, $\mathbf{128}_2$, and $\mathbf{128}_3$. AC terminals $\mathbf{128}_1$, $\mathbf{128}_2$, and $\mathbf{128}_3$ may further be connected to a load 120, and to a power delivery network 122 (e.g., a power grid, a micro-grid). Meter 114 may be connected to each phase of power delivery network 122 that is provided to load 120.

Switching legs $\mathbf{118}_1$, $\mathbf{118}_2$, and $\mathbf{118}_3$ may each comprise a plurality of switches, and may each be implemented as a half-bridge converter, a full bridge converter, or a multilevel converter (e.g., flying capacitor converter, a neutral point clamped converter, cascaded converter). Controller 108 may be partially or fully implemented as one or more computing devices and/or may include one or more processors, such as an Application Specific Integrated Circuit (ASIC) controller, Field Programmable Gate Array (FPGA) controller, a microcontroller, or a multipurpose computer. Referring to FIG. 1D, controller 108 may comprise one or more processors 109 connected to memory 111 and Input/Output (I/O) ports 113. Memory 111 may store computer readable instructions as well as data (e.g., measurements from sensor(s) 110 or parameters). I/O ports 113 may be configured to connect modules (e.g., sensor(s) 110, communications 112, user interface 116, or other modules of system 100) to processor 109. The one or more processors 109 may execute the instructions, which may result in the controller 108 performing one or more steps and/or functions as described herein that are attributed to the controller 108. Sensor(s) 110 may comprise one or more voltage sensors (e.g., implemented by employing a resistive or capacitive divider, a resistive or capacitive bridge, comparators), one or more current sensors (e.g., implemented by employing a Current Transformer (CT) sensor, a Hall Effect sensor, or a zero flux sensor), and/or one or more frequency sensors. Sensor(s) 110 may be located between load 120 and any of AC terminals 128$_1$, 128$_2$, and 128$_3$, and may be configured to measure the current, voltage, or both, provided to load 120. Sensor(s) 110 may further be located between power delivery network, 122 and any of AC terminals 128$_1$, 128$_2$, and 128$_3$, and may be configured to measure the current, voltage, or both, provided by power delivery network 122. For example, sensor(s) 110 may be located in meter 114. Sensor(s) 110 may be located between AC terminals 128$_1$, 128$_2$, and 128$_3$, and power converter 106. Sensor(s) 100 may be configured to measure one or more electrical characteristics such as current, voltage, frequency, or power, and provided the measured one or more electrical characteristics to power converter 106. Sensor(s) 110 may be connected to first DC terminals 124$_1$ and 124$_2$, and may be configured to measure the current, voltage, or both, provided by power source 102. Sensor(s) 110 may be connected to first DC terminals 126$_1$ and 126$_2$, and may be configured to measure the current, voltage, or both, provided to or by energy storage 104.

Communications interface 112 may be a receiver, a transmitter, or a transceiver, and may be configured to communicate, based on a communications protocol, signals with one or more other transmitters, receivers or transceivers. The communication protocol may define one or more characteristics of the signals and/or of communications using the signals, such as the transmission frequency or frequencies, a modulation scheme (e.g., Amplitude shift keying—ASK, Frequency shift keying—FSK, Quadrature Phase Shift Keying—QPSK, Quadrature Amplitude Modulation—QAM), multiple access scheme (e.g., Time Division Multiple Access—TDMA, Frequency Division Multiple Access—FDMA, Code Division Multiple Access—CDMA, Carrier Sense Multiple Access—CSMA, Aloha), encoding/decoding schemes (e.g., Non Return to Zero—NRZ, Manchester coding, Block coding), or any other characteristic. The transmitted or received signals, from or to communications interface 112, may comprise indications relating to disabling a switching leg or switching legs as further explained below. The transmitted or received signals, from or to communications interface 112 may comprise indications relating switching leg selection as further explained below.

Power source 102 may comprise one or more photovoltaic panels, for example a string of photovoltaic panels or an array of photovoltaic panels (e.g., parallel connected strings of photovoltaic panels). Power source 102 may alternatively or additionally comprise any of a battery or batteries, a supercapacitor, and/or a rectified AC generator (e.g., fossil fuel based generator, flywheel generator) configured to generate DC power at first DC terminals 124$_1$ and 124$_2$ of power converter 106. Energy storage 104 may comprise one or more batteries, such as a string of batteries, parallel connected batteries, or an array of batteries (e.g., parallel connected strings of batteries) configured to store energy from second DC terminals 126$_1$ and 126$_2$, or provide power (e.g., DC power) at second DC terminals 126$_1$ and 126$_2$. Energy storage 104 may alternatively or additionally comprise any of a supercapacitor or supercapacitors, a fuel cell or fuel cells, a flywheel or flywheels and the like. Energy storage 104 may comprise a converter or converters (e.g., a DC-DC converter, a DC-AC converter, a rectifier).

Power source 102 may provide DC power to power converter 106 at DC terminals 124$_1$ and 124$_2$. Controller 108 may control one or more of switching legs 118$_1$, 118$_2$, and 118$_3$, to convert the DC power at DC terminals 124$_1$ and 124$_2$, to AC power at AC terminals 128$_1$, 128$_2$, and 128$_3$ respectively. For example, controller 108 may employ a Pulse Width Modulation (PWM) signal to control one or more of switching legs 118$_1$, 118$_2$, and 118$_3$ to convert the DC power at DC terminals 124$_1$ and 124$_2$ to a respective phase of the three phases of the AC power provided by power delivery network 122.

In some cases, the power produced by power source 102 may be below the consumption of load 120. In such cases, controller 108 may be configured to control energy storage 104 (e.g., by controlling the DC-DC converter of energy storage 104) to provide power at second DC terminals 126$_1$ and 126$_2$, which may supplement power received from power source 102. For example, controller 108 may determine, based on one or more indications from sensor(s) 110, that the power produced by power source 102 is below the consumption of load 120. Based on this determination, controller 108 may control energy storage 104 to provide power at second DC terminals 126$_1$ and 126$_2$. In some cases, the power produced by power source 102 may be above the consumption of load 120. For example, controller 108 may determine, based on one or more indications from sensor(s) 110, that the power produced by power source 102 is above the consumption of load 120. Based on this determination, controller 108 may be configured to control energy storage 104 (e.g., by controlling the DC-DC converter in case the DC-DC converter is a bi-directional converter) to charge energy storage 104 from second DC terminals 126$_1$ and 126$_2$. In some cases, power converter 106 may be configured to convert AC power (e.g., from power delivery network 122) to DC power (e.g., power converter 106 is a bi-directional converter), to charge power storage 106.

The operational power production level of power converter 106 at any given time may be determined in a variety of ways, for example based on the ratio between the power actually being provided by power converter 106 at AC terminals 128$_1$, 128, and 128$_3$, and the maximum power the power converter 106 may provide. In some cases, power converter 106 may operate at an operational power production level of less than a capacity 100%, for example when power converter 106 is prevented from supplying power to power delivery network 122 and the power drawn by load 120 is lower than the maximum capacity of power converter 106. For example, power converter 106 may be rated to convert a maximum of 5 kilowatts of power (its maximum power capacity), but load 120 only draws 1 kilowatt of power (the operating power). Thus, the power being provided by power converter 106 at AC terminals $128_1$, 128, and $128_3$, is 1 kilowatt of operating power, which is lower than the rated maximum capacity of 5 kilowatts. In this example, the operational power production level of power converter 106 may be calculated as 1 kilowatt/5 kilowatts, or 20%. The power drawn by load 120 may be based on a measurement or measurements by the sensor(s) 110 (e.g., each located between load 120 and one of AC terminals $128_1$, $128_2$, and $128_3$). In some cases, the operational power production level of power converter 106 may be reduced because the power produced by power source 102 and/or energy storage 104 may be below the maximum capacity of power converter 106. For example, power converter 106 may be rated to convert a maximum of 5 kilowatts of power, but power source 102 produces only 2 kilowatts of power. The power produced by power source 102 and/or energy storage 104 may be based on a measurement or measurements by the sensor(s) 110 (e.g., located between and/or at DC terminals $124_1$ and $124_2$, and/or DC terminals $126_1$ and $126_2$). In these examples, in case power converter 106 continues to operate so as to be able to provide the maximum capacity of 5 kilowatts of power, the efficiency of power converter 106 may be reduced.

According to the disclosure herein, based on a power criterion, (for example, controller 108 determining that power converter 106 is operating at an operational power production level of less than a capacity 100%, or less than a threshold operational power production level other than 100%), controller 108 may determine to disable one or more of switching legs $118_1$, $118_2$, and/or $118_3$ (e.g., to increase the efficiency of power converter 106, to reduce the degradation of switching legs $118_1$, $118_2$, and/or $118_3$, or both), and cause the one or more switching legs to be disabled. For example, controller 108 may be configured to determine to disable one or more of switching legs $118_1$, $118_2$, and $118_3$, based on one or more criteria. The one or more criteria may comprise one or more power criteria. For example, a power criterion may be that power converter 106 is determined to be operating below an operational power production level threshold (e.g., below 100%, below 85%, below 75%, below 50%, below 25%, or any other value). For example, in case the operational power production level decreases below the operational power production level threshold, controller 108 may be configured to select at least one switching leg of switching legs $118_1$, $118_2$, and $118_3$, and to disable the selected at least one switching leg. The operational power production level threshold of the power criterion may be a predetermined value (e.g., predetermined at power converter 106 startup) or it may be a dynamically determined value based on historical, present, or predicted future operating conditions.

The one or more power criteria may comprise more than one operational power production level threshold. For example, based on controller 108 determining that the operating capacity decreases below a first operational power production level threshold (e.g., below 75%, below 65%, or any other value), controller 108 may determine that a switching leg is to be disabled, select a first switching legs of switching legs $118_1$, $118_2$, and $118_3$, and disable the selected first switching leg. Based on controller 108 determining that the operational power production level of power converter 106 decreases below a second operational power production level threshold (e.g., which may be of a value lower than the value of the first operational power production level threshold, such as 35%, 25%, or any other value), controller 108 may determine that two switching legs are to be disabled, select two switching legs of switching legs $118_1$, $118_2$, and $118_3$, and disable the selected two switching legs. In some cases the operational power production level of power converter 106 may reduce below a first operational power production level threshold, and subsequently reduce below a lower second operational power production level threshold without first returning to or above the higher first operational power production level threshold. In such cases, controller 108 may be configured to select a first switching leg of switching legs $118_1$, $118_2$, and $118_3$, disable the selected first switching legs, and subsequently (based on the operational power production level dropping below the second operational power production level threshold) select a second switching leg (different from the first switching leg) of switching legs $118_1$, $118_2$, and $118_3$, and further disable the selected second switching leg while the first switching leg remains disabled.

According to the disclosure herein, controller 108 may be configured to determine to disable one or more switching legs of switching legs $118_1$, $118_2$, and $118_3$ based on a comparison of a measured electrical characteristic with one or more criteria. The one or more criteria may be, for example, a power criterion that the power drawn by load 120 is below a power threshold (e.g., below 10 kW, below 5 kW, below 3 kW, below 1 kW, below 500 W, or any other value). For example, sensor(s) 110 may measure one or more electrical characteristics of load 120. Controller 108 may determine the power drawn by load 120 from measurement of the one or more electrical characteristic (e.g., directly if sensor(s) 110 measure power, or by calculations in case sensors(s) measure voltage across load 120, current drawn by load 120, or both). Controller 120 may compare the power drawn by load 120 with the power threshold. The power drawn by the load may comprise power drawn via one, some, or all of plurality of AC terminals $128_1$, $128_2$, and $128_3$. Based on controller 108 determining that the power drawn by load 120 decreases below a power threshold (e.g., below 4 kW, below 3 KW, or any other value) of the power criterion, controller 108 may determine that at least one switching leg of switching legs $118_1$, $118_2$, and $118_3$ is to be disabled, select one or more of the switching legs, and cause the selected one or more switching legs to be disabled.

The one or more power criteria may comprise more than one power threshold. For example, based on controller 108 determining that the power drawn by load 120 decreases below a first load power consumption threshold (e.g., below 4 kW, below 3.5 kW, or any other value), controller 108 may determine that one of switching legs $118_1$, $118_2$, and $118_3$ is to be disabled, select a first switching leg of switching legs $118_1$, $118_2$, and $118_3$, and disable the selected first switching leg. Based on controller 108 determining that the power drawn by load 120 decreases below a second load power consumption threshold (e.g., which may be of a value lower than the value of the first load power consumption threshold, such as 2 kW, 1 kW, or any other value), controller 108 may determine that two switching legs of switching legs $118_1$, $118_2$, and $118_3$ are to be disabled, select two of switching legs $118_1$, $118_2$, and $118_3$, and disable the selected two switching legs. In some cases the power drawn by load 120 may reduce below a first load power consumption threshold, and subsequently reduce below a lower second load power consumption threshold without first returning to or above the higher first load power consumption threshold. In such cases, controller 108 may be configured to select a first switching leg of switching legs $118_1$, $118_2$, and $118_3$, disable the selected first switching leg, and subsequently (based on the power drawn by load 120 dropping below the second load power consumption threshold) select a second switching leg of switching legs 118$_1$, 118$_2$, and 118$_3$, and disable the selected second switching leg while the first switching leg remains disabled. The power criteria may be based on measurement of an electrical characteristic (e.g., by sensor (s) 110). For example, sensor(s) 110 may measure the current through one or more of AC terminals 128$_1$, 128$_2$, and 128$_3$ and determine the power drawn by load 120 by multiplying the measured current by voltage at AC terminals 128$_1$, 128$_2$, and 128$_3$ (e.g., line-to-line voltage, line-to-neutral voltage). For example, sensor(s) 110 may measure the voltage at first DC terminals 124$_1$ and 124$_2$. Controller 108 may determine that the power produced by power source 102 based on a reduction in the voltage at first DC terminals 124$_1$ and 124$_2$. For example, sensor(s) 110 may measure the current through, and the voltage at second DC terminals 126$_1$ and 126$_2$. Controller 108 may determine the State Of Charge (SOC) of energy storage 104 based on the measured current and voltage (e.g., by employing integration).

One or more of the switching legs may be disabled (e.g., by controller 108) in various ways. For example, disabling a switching leg or switching legs may comprise controlling (e.g., by controller 108) one or more switches in the selected switching leg or switching legs to be in a non-conducting state. As a further example, disabling a switching leg or switching legs may comprise controlling a disabling switch, connected between each of switching legs 118$_1$, 118$_2$, and/or 118$_3$ to be disabled and a corresponding AC terminal 128$_1$, 128$_2$, and/or 128$_3$ to be in a non-conducting state (e.g., as further explained below in conjunction with FIGS. 2A-2C). With reference to FIG. 1A, controller 108 controls all of switching legs 118$_1$, 118$_2$, and 118$_3$ to convert power. With reference to FIG. 1B, controller 108 controls switching legs 118$_2$, and 118$_3$ to convert power. However, switching leg 118$_1$ is disabled, as indicated by the dashed-line depiction of switching leg 118$_1$, and by the dashed line between switching leg 118$_1$ and AC terminal 128$_1$. For example, controller 108 disables switching leg 118$_1$ by controlling one or more of the switches in switching leg 118$_1$ to be in a non-conducting state. With reference to FIG. 1C, controller 108 controls switching legs 118$_1$ to convert power. However, switching legs 118$_2$ and 118$_3$ are disabled, as indicated by dashed switching legs 182 and 118$_3$, and by the dashed line between switching legs 118$_2$ and 118$_3$ and AC terminal 118$_2$ and 118$_3$ respectively. For example, controller 108 disables switching legs 118$_2$ and 118$_3$ by controlling one or more of the switches in switching legs 118$_2$ and 118$_3$ to be in a non-conducting state.

In some cases, disabling a switching leg may cause imbalance of power between the phases of the power delivery network 122 (e.g., since even if a switching leg for a given phase is disabled, power delivery network 122 may continue to provide power to the load via the phase of the disabled switching leg). In some cases, repeatedly disabling the same switching leg may cause degradation of the other switching legs. Controller 108 may be configured to select a switching leg or switching legs to be disabled, based on a selection criterion. For example, controller 108 may be configured to randomly select the switching leg or switching legs to be disabled (e.g., based on a distribution function). Thus, in case multiple power systems such as power system 100 are employed and connected with power delivery network 122, the phases of the disabled switching legs may be distributed between the multiple power systems, or the degradation of the switching legs may be distributed between switching legs 118$_1$, 118$_2$, or 118$_3$. The term "randomly" as used herein is intended to include both purely random selection as well as pseudorandom selection. According to aspects of the disclosure herein, controller 108 may be configured to select the switching leg or switching legs to be disabled for each of a plurality of time intervals. Thus, a different one, or different ones of switching legs 118$_1$, 118$_2$, or 118$_3$, may be disabled at each time interval, distributing the phase imbalance, or degradation of the switching legs over time. For example, controller 108 may be configured to select the switching leg or switching legs to be disabled based on a predetermined sequence, a cyclic sequence, a random sequence, or any other type of sequence. Controller 108 may be configured to select the initial switching leg or switching legs to be disabled in the determined sequence in any way desired, such as randomly, or calculated or otherwise determined based on a characteristic associated with power converter 106 such as a digit or sequence in a serial number of power converter 106.

Controller 108 may select a switching leg or switching legs to be disabled based on a measurement or measurements from sensor(s) 110. For example, sensor(s) 110 may measure the voltage between phases of power delivery network 122 (e.g., line-to-line voltage), or between each phase and a reference (e.g., line-to-neutral voltage). based on the voltage measurement or measurements indicating a voltage drop of one or more of the phases, for example phase A, controller 108 may not select the switching leg(s) corresponding to the voltage-dropped one or more phases (e.g., phase A) since such a voltage drop may indicate that the switching leg(s) (e.g., phase A) is/are overloaded. Disabling the switching leg corresponding to phase A in this example may increase the load on phase A (e.g., since power delivery network 122 would provide additional power at phase A to load 120 to make up for the power lost by the disabled phase A switching leg). Sensor(s) 110 may measure a frequency of one or more of the phases of power delivery network 122. In case the frequency measurement or measurements indicate a drop in frequency of one or more of the phases, for example phase B, controller 108 may not select phase B since such a drop in frequency may indicate that phase B is overloaded.

Communications interface 112 may be configured to receive a signal (e.g., from a power company, from a micro-grid controller, from systems similar to power system 100), which may comprise an indication relating to disabling a switching leg or switching legs. Communications interface 112 may provide the signal to controller 108. The received signal may comprise an indication relating to the switching leg or switching legs selection, and controller 108 may select, based on the received signal, one or more switching legs to be disabled. For example, communications interface 112 may receive a signal which may comprise an indication to disable switching leg 118$_2$ (e.g., by indicating the phase corresponding to switching leg 118$_2$). For example, communications interface 112 may receive a signal from a power company that phase C in power distribution network 122 is overloaded. In such a case, controller 108 may not select phase C since disabling the switching leg corresponding to phase C may increase the load on phase C. Receiving signals from one or more other systems similar to power system 100 is further elaborated below in conjunction with FIG. 5.

FIG. 1A shows power converter 106 in a state in which all of switching legs 118$_1$, 118$_2$, and 118$_3$ are enabled and may provide power to the corresponding AC terminals 128$_1$, 128$_2$, and 128$_3$. With reference to FIG. 1B, controller 108 has selected to disable switching leg 118$_1$, and has disabled switching leg 118$_1$ by controlling one or more of the switches of switching leg 118$_1$ to be in a non-conducting state. Thus, while disabled, switching leg $118_1$ may not provide power to AC terminal $128_1$. However, even while switching leg $118_1$ is disabled, power delivery network 122 may continue to provide power to AC terminal $128_1$. With reference to FIG. 1C, controller 108 has selected to disable switching legs $118_2$, and $118_3$ and has disabled switching legs $118_2$, and $118_3$ by controlling one or more of the switches of switching legs $118_2$ and $118_3$ to be in a non-conducting state. Thus, while disabled, switching legs $118_2$, and $118_3$ may not provide power to respective AC terminals $128_2$, and $128_3$. However, even while switching legs $118_2$, and $118_3$ are disabled, power delivery network 122 may provide power to AC terminals $128_2$ and $128_3$.

Figure 2A:
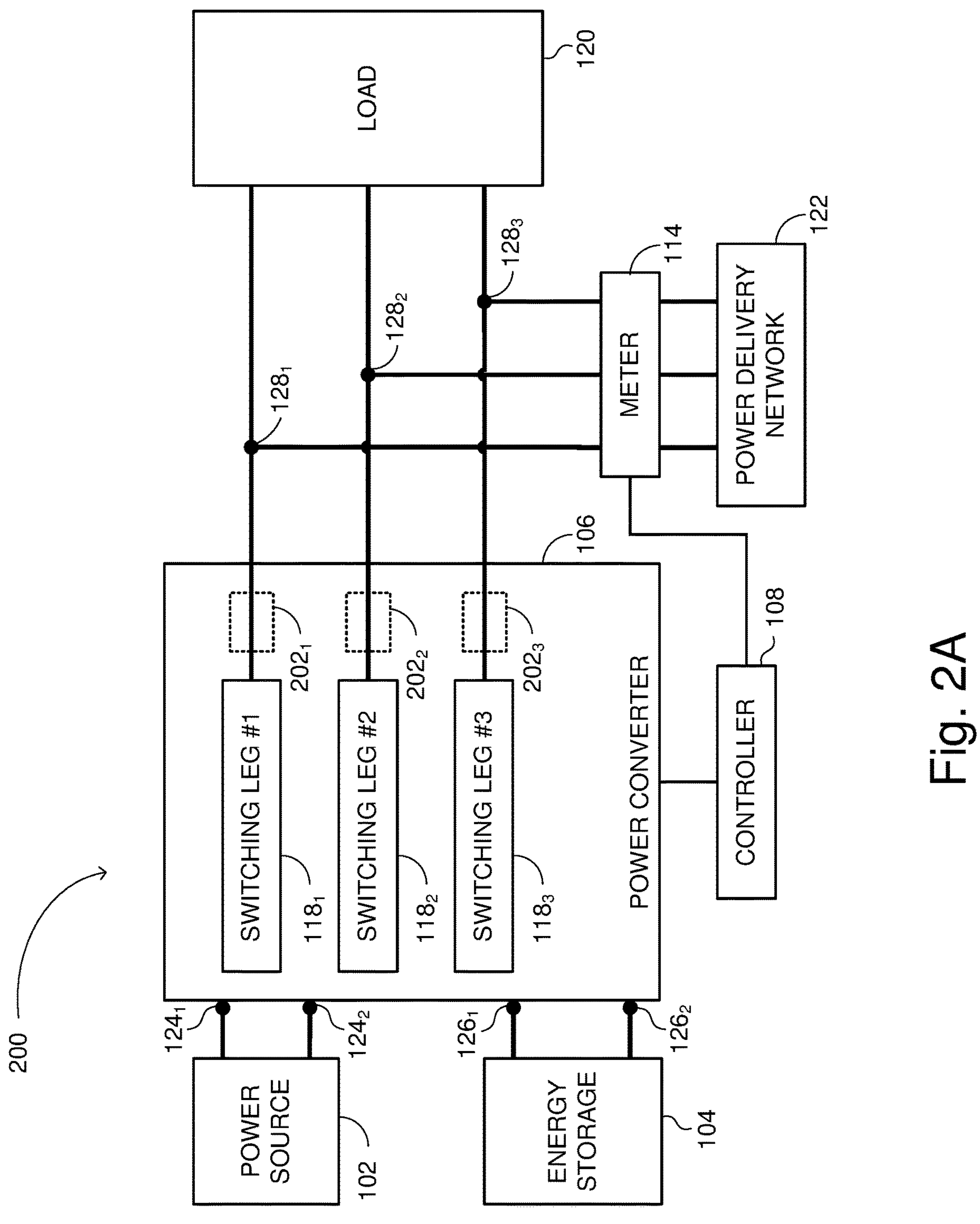
FIG. 2A illustrates an example power system in accordance with aspects of the disclosure herein in which all switching legs are enabled.
Figure 2B:
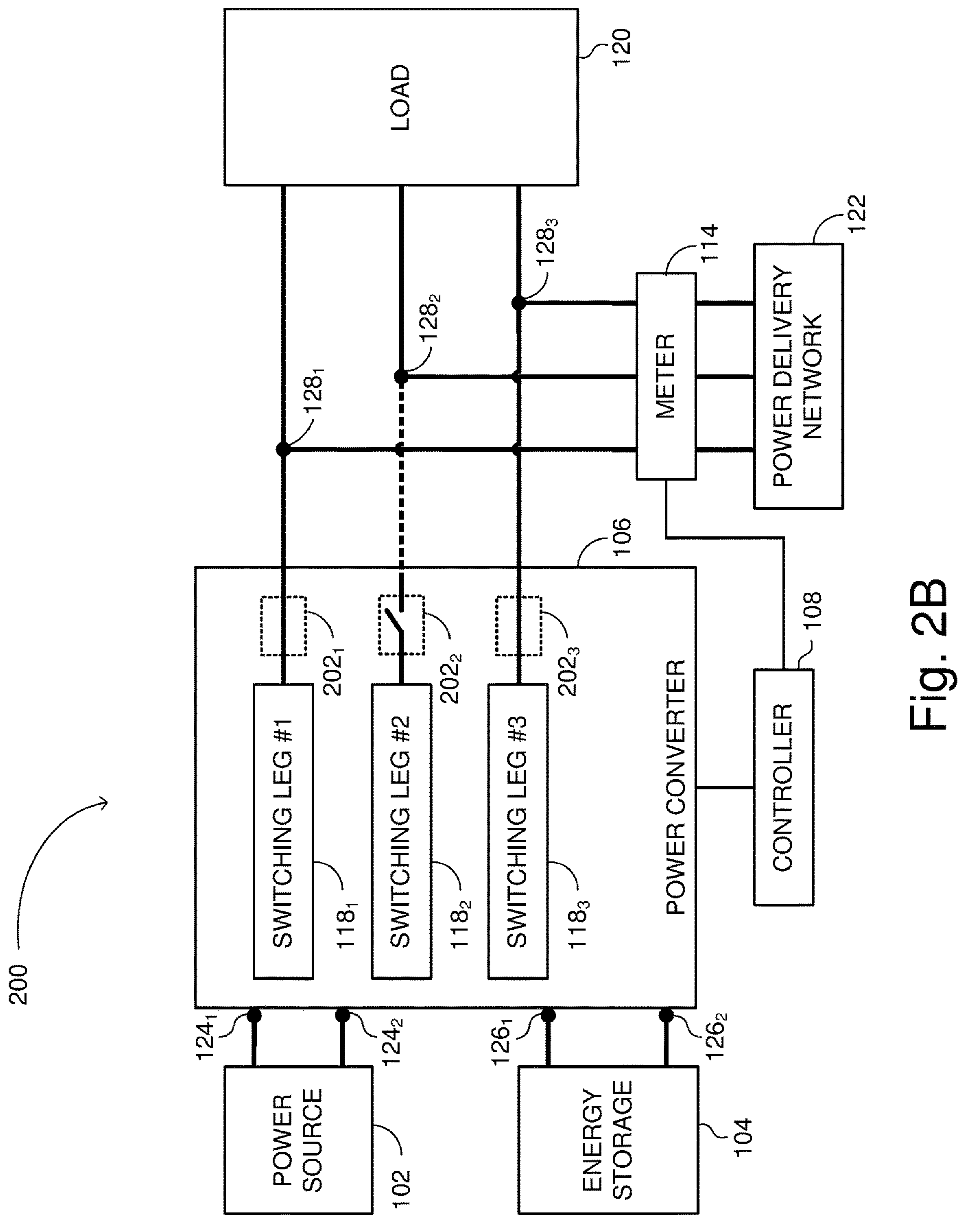
FIG. 2B illustrates the power system of FIG. 2A in accordance with aspects of the disclosure herein in which one switching legs is disabled.
Figure 2C:
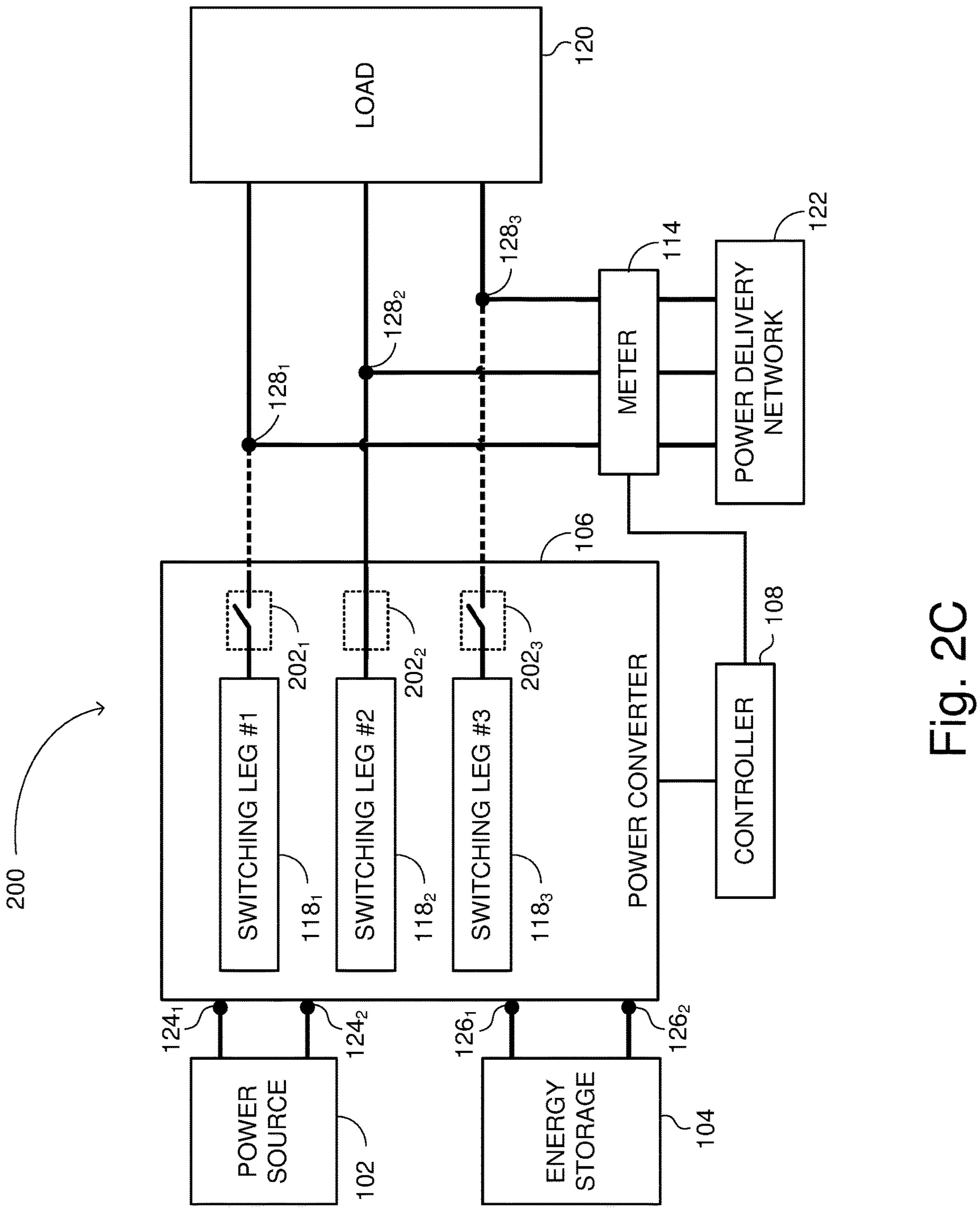
FIG. 2C illustrates the power system of FIG. 2A in accordance with aspects of the disclosure herein in which two switching legs are disabled.

Reference is made to FIGS. 2A, 2B, and 2C, which illustrate a power system, generally referenced 200, in accordance with aspects of the disclosure herein. Power system 200 may be similar to power system 100 (FIGS. 1A-1D), and the same or similar elements as in power system 100 are labeled with the same reference numbers. Power system 200 may further comprise a first switch $202_1$, a second switch $202_1$, and a third switch $202_3$. Moreover, power system 200 may be further consistent with FIG. 1D, where "100" would be replaced with "200." First switch $202_1$ may be connected between switching leg $118_1$ and AC terminal $128_1$. Second switch $202_2$ may be connected between switching leg $118_2$ and AC terminal $128_2$. Third switch $202_3$ may be connected between switching leg $118_3$ and AC terminal $128_3$. Controller 108 may be configured to control first switch $202_1$, second switch $202_2$, or third switch $202_3$ to transition between a conducting state and a non-conducting state, or vice versa. Controller 108 may determine that one or more of switching legs $118_1$, $118_2$, or $118_3$ may be disabled and select one or more of switching legs $118_1$, $118_2$, or $118_3$ (e.g., similar to as described above in conjunction with FIGS. 1A-1D). Controller 108 may disable the selected one or more of switching legs $118_1$, $118_2$, or $118_3$ by controlling the corresponding one of first switch $202_1$, second switch $202_2$, or third switch $202_3$ to transition to a non-conducting state. Thus, the disabled switching leg or switching legs may not provide power to the corresponding one of AC terminals $128_1$, $128_2$, or $128_3$.

With reference to FIG. 2A, first switch $202_1$, second switch $202_1$, and third switch $202_3$ may all be in a conducting state, and switching legs $118_1$, $118_2$, or $118_3$ may provide power to the corresponding AC terminals $128_1$, $128_2$, and $128_3$. With reference to FIG. 2B, controller 108 has selected to disable switching leg $118_2$, and has disabled switching leg $118_2$ by controlling the second switch $202_2$ to be in a non-conducting state. Thus, switching leg $118_2$ may be disconnected from AC terminal $128_1$ and may not provide power to AC terminal $128_1$. However, power delivery network 122 may continue to provide power to AC terminal $128_2$. With reference to FIG. 2C, controller 108 has selected to switching legs $118_1$, and $118_3$ and has disabled switching legs $118_1$, and $118_3$ by controlling the first switch $202_1$ and third switch $202_3$ to be in a non-conducting state. Thus, switching legs $118_1$ and $118_3$ may be disconnected from AC terminals $128_1$ and $128_3$ respectively, and may not provide power to AC terminals $128_1$ and $128_3$. However, power delivery network 122 may continue to provide power to AC terminals $128_1$, and $128_3$. First switch $202_1$, second switch $202_2$, and third switch $202_3$ may be implemented, for example, by a switchgear controlled by controller 108.

Figure 3:
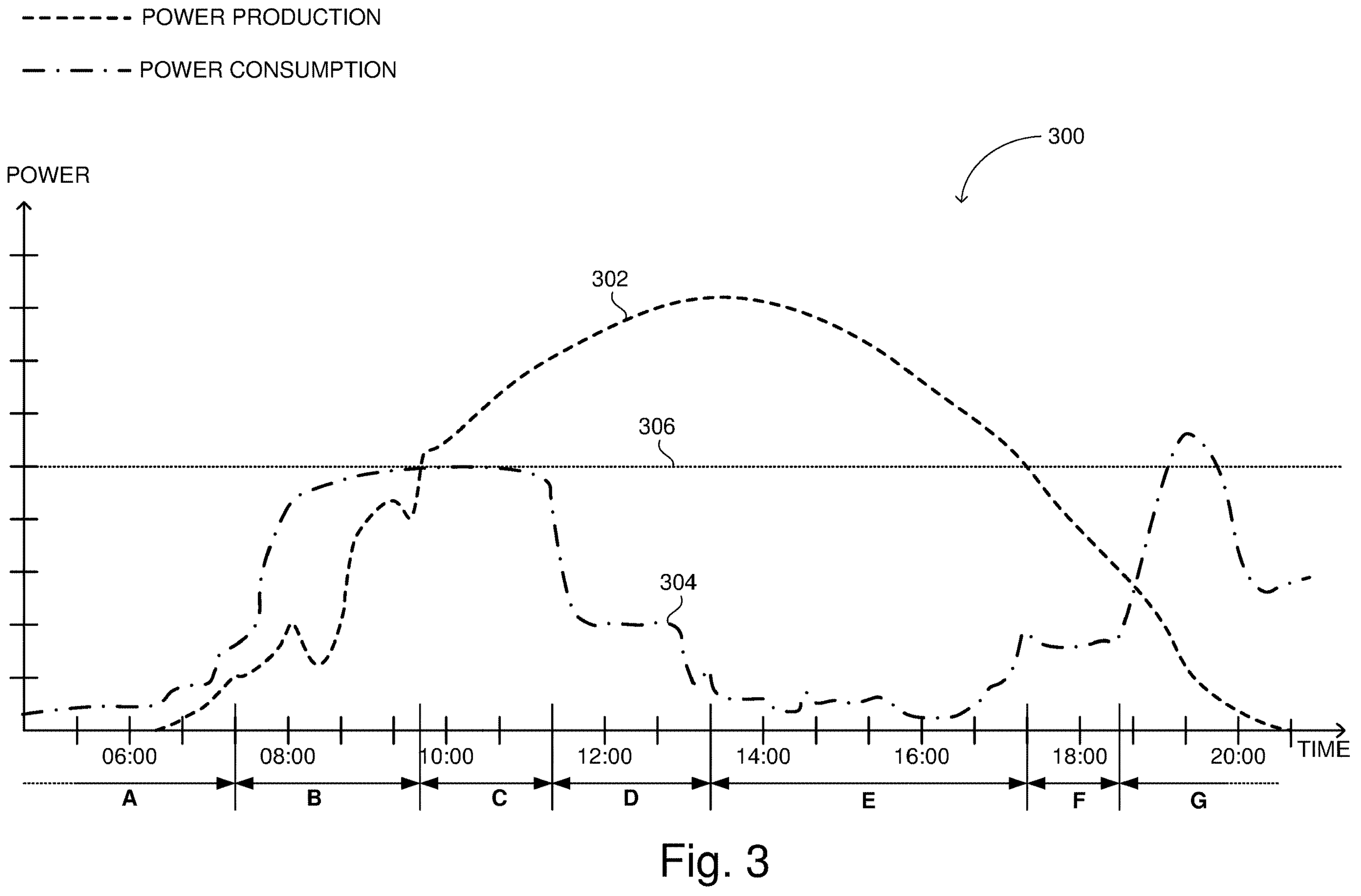
FIG. 3 illustrates a graph which depicts an example power production curve, an example load power consumption curve, and an example maximum capacity level of a DC-AC power converter.

Reference is now made to FIG. 3, which is a schematic illustration of a graph, generally referenced 300, which depicts an example power production curve 302 (e.g., of power produced by power source 102), and an example load power consumption curve 304 (e.g., power consumed by load 120) between 04:40 in the morning until 20:40 in the evening. Line 306 depicts the example maximum capacity of power converter 106. FIG. 3 may show that power converter 106 (e.g., FIGS. 1A-ID, or FIGS. 2A-2C) may operate at varying capacities during the day (e.g., either due to low power consumption by load 120, due to low power production by source 102, or due to both).

In the example depicted in FIG. 3, during time period 'A' the power 302 produced by power source 102 may be lower than the maximum capacity 306 of power converter 106. Also the power 304 consumed by load 120 may be lower than the maximum capacity 306 of power converter 106. Based on the low power produced by power source 102 and/or the low power consumed by load 120, during time period 'A' controller 108 may determine to disable two selected ones of switching legs $118_1$, $118_2$, or $118_3$. During time period 'B', the power 302 produced by power source 102 may be lower than the maximum capacity 306 of power converter 106. Also the power 302 produced by power source 102 is lower than the power 304 consumed by load 120. The power 304 consumed by load 120 during time period 'B', and the power 302 produced by power source 102 is higher than during time period 'A', and based on this controller 108 may determine to disable a selected one of switching legs $118_1$, $118_2$, or $118_3$. During time period 'C', the power 302 produced by power source 102 may be higher than the maximum capacity 306 of power converter 106. Also load 120 draws power 304 from power converter 106 at the maximum capacity 306 of power converter 106. Based on this, during time period 'C' controller 108 may determine not to disable anyone of switching legs $118_1$, $118_2$, or $118_3$. During time period 'D', the power 304 consumed by load 120 reduces below the maximum capacity 306 of power converter 106. Based on this, during time period 'D' controller 108 may determine to disable a selected one of switching legs $118_1$, $118_2$, or $118_3$. During time period 'E', the power 304 consumed by load 120 reduces further below the maximum capacity 306 of power converter 106. Based on this, during time period 'E' controller 108 may determine to disable selected two of switching legs $118_1$, $118_2$, or $118_3$. During time period 'F', the power 304 consumed by load 120 increases relative to the time period 'E'. However, the power 304 consumed by load 120 is still below the maximum capacity 306 of power converter 106, and lower than the power 302 produced by power source 102. Based on this, during time period 'F' controller 108 may determine to disable a selected one of switching legs $118_1$, $118_2$, or $118_3$. During time period G, the power 302 produced by power source 102 reduces below the maximum capacity 306 of power converter 102. Based on this, during time period G controller 108 may determine to disable two selected ones of switching legs $118_1$, $118_2$, or $118_3$. In time period G, load 120 may import power from power delivery network 122. In the above discussion of FIG. 3, (and for any other examples discussed herein that refer to a maximum capacity of a power converter), maximum capacity 306 may be replaced with another fixed or dynamic power value that may be or may not be the actual rated maximum capacity of power converter 106. For example, it may be desired to use a value for maximum capacity 306 that is lower than the actual rated maximum capacity of power converter 106.

Figure 4:
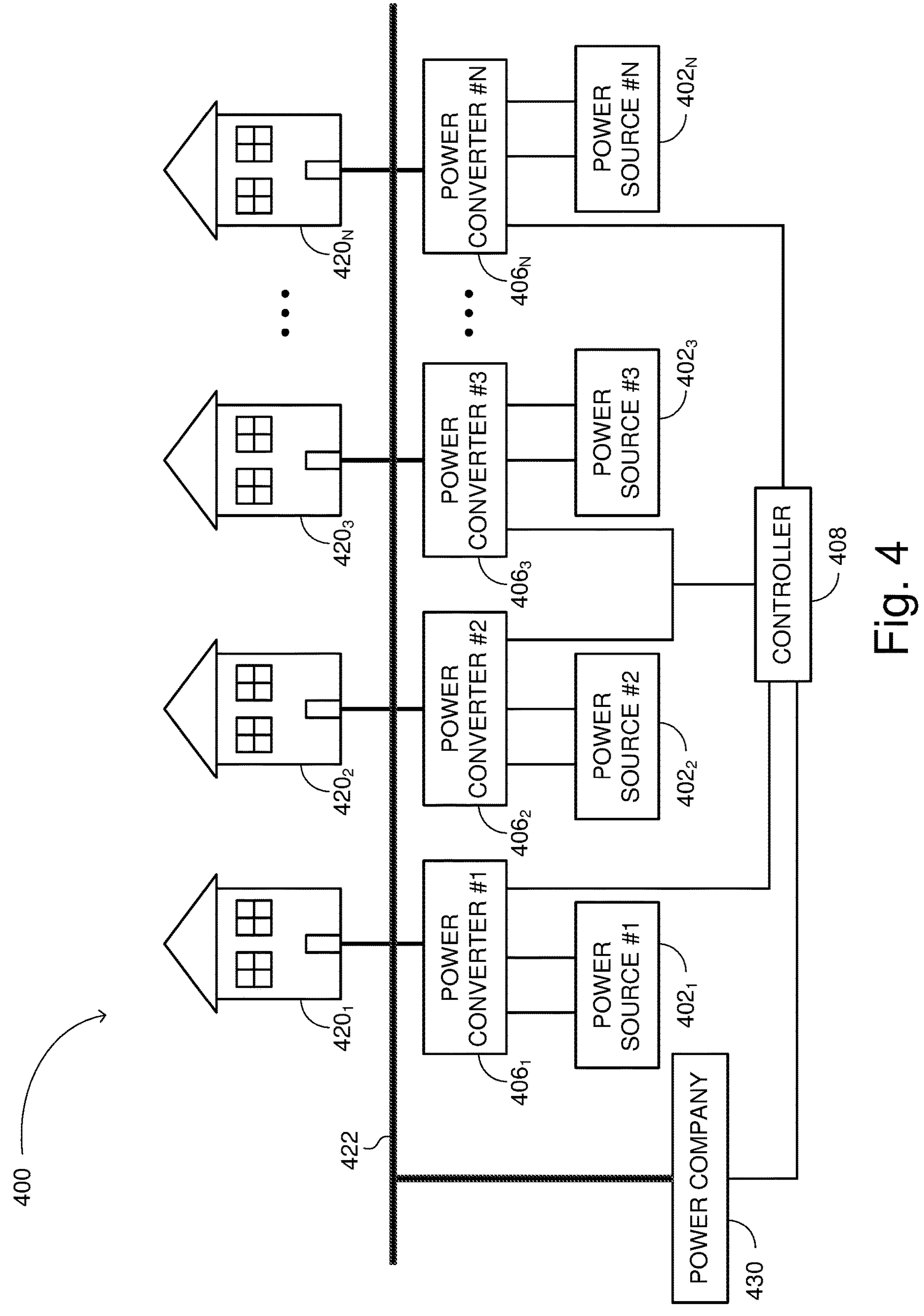
FIG. 4 illustrates an example system in which a controller may control a plurality of power converters.

As mentioned above, where multiple power converters (e.g., power converters 106) are connected to the same power delivery network (such as power delivery network 122), more than one power converter (such as more than one power converters 106) disabling the same switching leg of switching legs at the same time may cause an imbalance between the phases of a power delivery network. The controller (e.g., controller 108—FIGS. 1A-ID, 2A-2C) may control a plurality of power converters, and may be considered a central controller. Reference is now made to FIG. 4, which shows an example system, generally reference 400, in which a controller 408 may control a plurality of DC-AC power converters $\mathbf{406}_1$-$\mathbf{406}_N$. DC-AC power converters $\mathbf{406}_1$-$\mathbf{406}_N$ may be connected to respective power sources $\mathbf{402}_1$-$\mathbf{402}_N$ and to respective loads $\mathbf{420}_1$-$\mathbf{420}_N$. DC-AC power converters $\mathbf{406}_1$-$\mathbf{406}_N$ and load loads $\mathbf{420}_1$-$\mathbf{420}_N$ may be connected to a power delivery network 422, which may deliver power from a power company 430. Controller 408 may be connected to DC-AC power converters $\mathbf{406}_1$-$\mathbf{406}_N$. Each of power sources $\mathbf{402}_1$-$\mathbf{402}_N$ may be the same as or similar to power source 102 (FIGS. 1A-1D, FIGS. 2A-2C). Each of power converters DC-AC $\mathbf{406}_1$-$\mathbf{406}_N$ may be the same as or similar to power converter 106 (FIGS. 1A-1D, FIGS. 2A-2C). Each of loads $\mathbf{420}_1$-$\mathbf{420}_N$ may be the same as or similar to load 120 (FIGS. 1A-ID, FIGS. 2A-2C), and power delivery network 422 may be the same as or similar to power delivery network 122 (FIGS. 1A-ID, FIGS. 2A-2C). For the sake of simplicity of FIG. 4 and the explanation thereof, only power converters DC-AC $\mathbf{406}_1$-$\mathbf{406}_N$, power sources $\mathbf{402}_1$-$\mathbf{402}_N$, loads $\mathbf{420}_1$-$\mathbf{420}_N$ and controller 408 are depicted in FIG. 4. However, it is understood that FIG. 4 may relate to a plurality of power systems such as power systems 100 or 200 described above in FIGS. 1A-1D or 2A-2C.

Controller 408 may determine to disable a switching leg or switching legs in each of one or more of DC-AC power converters $\mathbf{406}_1$-$\mathbf{406}_N$ based on power consumed by the respective loads $\mathbf{420}_1$-$\mathbf{420}_N$, power produced by the respective power sources $\mathbf{402}_1$-$\mathbf{402}_N$, or both. Controller 408 may select the switching legs to be disabled so as to reduce or even minimize an imbalance between the phases relating to disconnected switching legs. For example, controller 408 may select to disable switching legs '1' and '2' of DC-AC power converter $\mathbf{406}_1$ (e.g., corresponding to phases 'A' and 'B' of power delivery network 422), switching legs '2' and '3' of DC-AC power converter $\mathbf{406}_2$ (e.g., corresponding to phases 'B' and 'C' of power delivery network 422), and switching legs '1' and '3' of DC-AC power converter $\mathbf{406}_3$ (e.g., corresponding to phases 'A' and 'C' of power delivery network 422). Thus, in this example, two switching legs may be disabled from each phase of power delivery network 422, although the specific two switching legs that are disabled may be different amongst the various power converters $\mathbf{406}_1$-$\mathbf{406}_N$. Controller 408 may store, for each phase of power delivery network, 422, a count of the number of switching legs disabled from the phase. The counts may be stored, for example, in memory 111. Controller 408 may select, based on the counts, further switching legs to be disabled, for example to equalize the counts for each phase and/or to reduce or even minimize an imbalance between the phases relating to disconnected switching legs. For example, assume that controller 408 has already disabled two switching legs corresponding to phase 'A', two switching legs corresponding to phase 'C', and three switching legs corresponding to phase 'D'. If controller 408 has subsequently determined to disable an additional switching leg for one of power converters $\mathbf{406}_1$-$\mathbf{406}_N$, (for example, power converter $\mathbf{406}_3$) controller 408 may select which switching leg of power converter $\mathbf{406}_3$ to disable based on the relative counts for each phase. If, in this example, controller 408 were to disable switching leg '1' or switching leg '2' of power converter $\mathbf{406}_3$, then the counts of the number of switching legs disabled for phases A, B, and C respectively would change from [2, 2, 3] to [3, 2, 3] or [2, 3, 3]. This would cause the counts to be close together in value than before the disabling of switching legs '1' or '2'. However, if controller 408 were instead to disable switching leg '3' of power converter $\mathbf{406}_3$, then the resulting counts would be more different from one another, resulting in [2, 2, 4] for phases 'A', 'B', and 'C', respectively. Thus, controller 408 may select one of switching legs '1' or '2' based on the counts in this example. Controller 408 may further select one of switching legs '1' or '2' based on whether switching leg '1' or '2' of power converter $\mathbf{406}_3$ is already disabled. For example, if switching leg 'l' is already disabled, then controller 408 may select switching leg '2' to be disabled. When a given switching leg is enabled after being disabled, then the count for the associated phase may be reduced accordingly.

Figure 5:
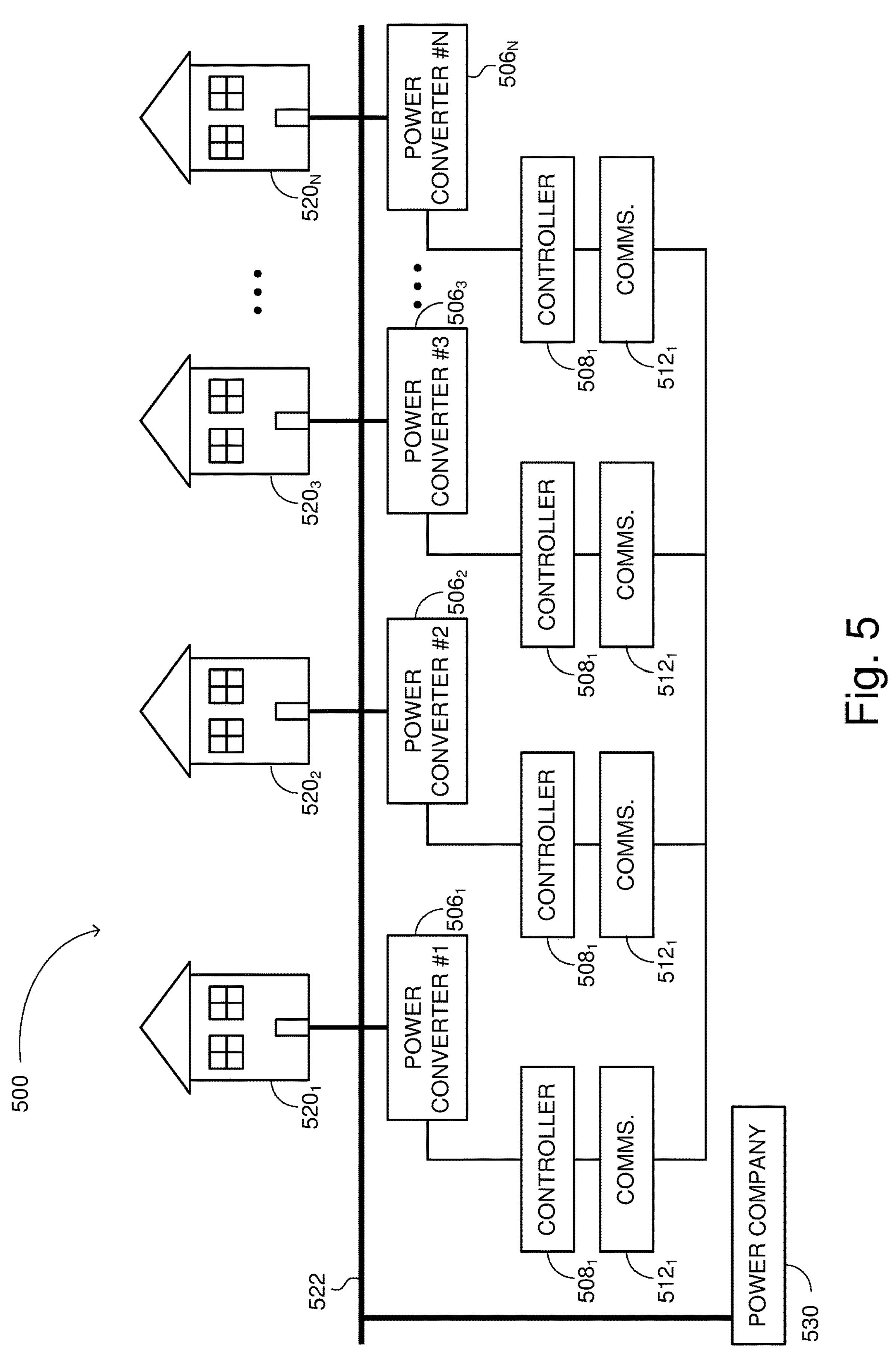

While controller 408 is shown by way of example as a single block in FIG. 4, controller 408 may physically be implemented as a single central unit or implemented as multiple distributed physical units, such as sub-units each co-located with a respective one of power converters $\mathbf{406}_1$-$\mathbf{406}_N$. An example of this is shown more explicitly in FIG. 5, in which multiple power systems may communicate there between to minimize an imbalance between the phases relating to disconnected switching legs. As shown in FIG. 5, a system, generally reference 500, may comprise a plurality of power systems that may communicate there between. For the sake of simplicity of FIG. 5 and the explanation thereof, only power converters $\mathbf{506}_1$-$\mathbf{506}_N$, controllers $\mathbf{508}_1$-$\mathbf{508}_N$, loads $\mathbf{520}_1$-$\mathbf{520}_N$ and communications interfaces $\mathbf{512}_1$-$\mathbf{512}_N$ are depicted in FIG. 5. However, it is understood that FIG. 5 may relate to a plurality of power systems such as described above in FIG. 1D.

Power converters $\mathbf{506}_1$-$\mathbf{506}_N$ may be connected to loads $\mathbf{520}_1$-$\mathbf{520}_N$. Power converters $\mathbf{506}_1$-$\mathbf{506}_N$ and load loads $\mathbf{520}_1$-$\mathbf{520}_N$ may be connected to a power delivery network 522, which may deliver power from a power company 530. Controllers $\mathbf{508}_1$-$\mathbf{508}_N$ may be connected to respective power converters $\mathbf{506}_1$-$\mathbf{506}_N$ and to respective communications interfaces $\mathbf{512}_1$-$\mathbf{512}_N$. Each of power converters $\mathbf{506}_1$-$\mathbf{506}_N$ may be the same as or similar to power converter 106 (FIGS. 1A-1D, FIGS. 2A-2C). Each of controllers $\mathbf{508}_1$-$\mathbf{508}_N$ may be the same as or similar to controller 108 (FIGS. 1A-1D, FIGS. 2A-2C). Each of communications interfaces $\mathbf{512}_1$-$\mathbf{512}_N$ may be the same as or similar to communications interface 112 (FIGS. 1A-1D, FIGS. 2A-2C). Each of loads $\mathbf{520}_1$-$\mathbf{520}_N$ may be the same as or similar to load 120 (FIGS. 1A-ID, FIGS. 2A-2C), and power delivery network 522 may be the same as or similar to power delivery network 122 (FIGS. 1A-1D, FIGS. 2A-2C).

Each of controllers $\mathbf{508}_1$-$\mathbf{508}_N$ may determine to disable a switching leg or switching legs of a corresponding power converter $\mathbf{506}_1$-$\mathbf{506}_N$. A controller, of controllers $\mathbf{508}_1$-$\mathbf{508}_N$ may select the switching legs to be disabled based on a signal or signal received from other ones of controllers $\mathbf{508}_1$-$\mathbf{508}_N$, via a respective one of communications interfaces $\mathbf{512}_1$-$\mathbf{512}_N$. For example, controller $\mathbf{508}_3$ may select to disable switching legs '1' and '2' of power converter $\mathbf{506}_3$ (e.g., corresponding to phase 'A' and 'B' or power delivery network 522). Controller $\mathbf{508}_3$ may transmit, via communications interface $\mathbf{512}_3$, to one or more of the other ones of controllers $\mathbf{508}_1$-$\mathbf{508}_N$, a signal relating to the switching legs disabled by controller $\mathbf{508}_3$ (for example, indicating which one or more switching legs are newly disabled or currently disabled, and/or indicating which one or more switching legs are no longer disabled or currently enabled). Transmission of such signals may be via direct connection lines and/or via one or more networks such as the internet and/or a wireless cellular network. Controller $508_1$ may receive the signal relating to the switching legs disabled by controller $508_3$ via communications interface $512_1$. Controller $508_1$ may select to disable switching legs '2' and '3' of power converter $506_1$ (e.g., corresponding to phase 'B' and 'C' or power delivery network 522). Controller $508_1$ may transmit, via communications interface $512_1$, to the other ones of controllers $508_1$-$508_N$, a signal relating to the switching legs disabled by controller $508_1$. Controller $508_2$ may receive the signal relating to the switching legs disabled by controller $508_1$ and controller $508_3$ via communications interface $512_2$. Controller $508_2$ may select to disable switching legs '1' and '3' of power converter $506_2$ (e.g., corresponding to phase 'A' and 'C' or power delivery network 522). Controller $508_2$ may transmit, via communications interface $512_2$, to the other ones of controllers $508_1$-$508_N$, a signal relating to the switching legs disabled by controller $508_2$. Each one of controllers $508_1$-$508_N$ may store a count of the number of switching legs disabled from each phase of power delivery network 522, from the received signals, and select other switching legs to be disabled based on this count, so as to minimize an imbalance between the phases relating to disconnected switching legs. The counts may be maintained and utilized, by each controller $508_1$-$508_N$, for switching leg selection in the same manner as discussed above with respect to FIG. 4.

Controllers $508_1$-$508_N$ may receive, via the corresponding communications interfaces $512_1$-$512_N$, a signal, for example, from power company 530. Such a signal may relate to (e.g., be based on and/or indicate) one or more electric characteristics of one or more of the phases of power delivery network 522. The one or more electric characteristics of the phases may be voltage (e.g., line-to-line voltage, line-to-neutral voltage), current, frequency, or any combination thereof. The signal from power company 530 may relate directly to switching legs selection of controllers $508_1$-$508_N$. For example, the signal may indicate which phases each of controllers $508_1$-$508_N$ may, or may not disable.

Figure 6A:
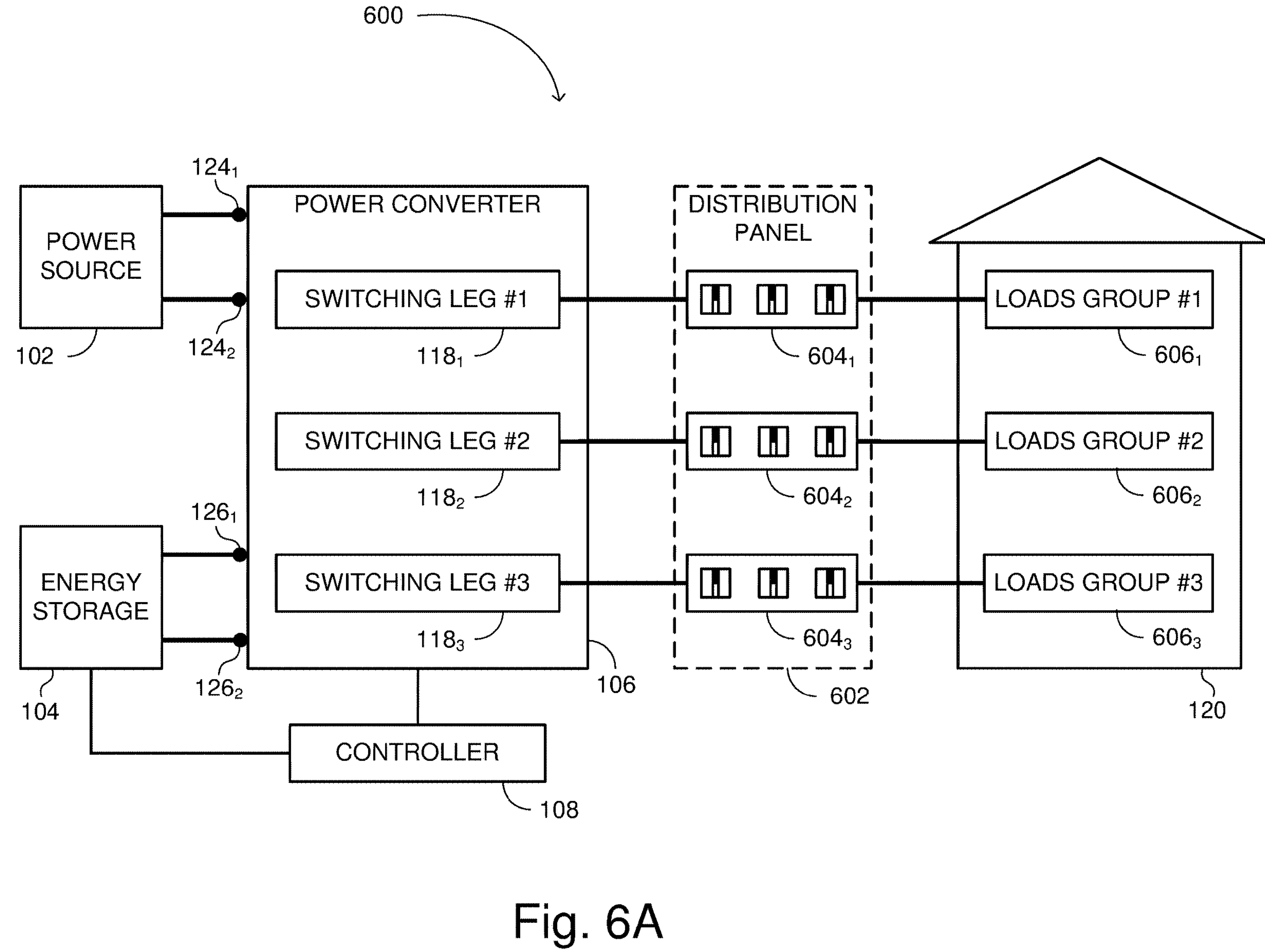
FIG. 6A illustrates an example power system in accordance with aspects of the disclosure herein in which all switching legs are enabled.
Figure 6B:
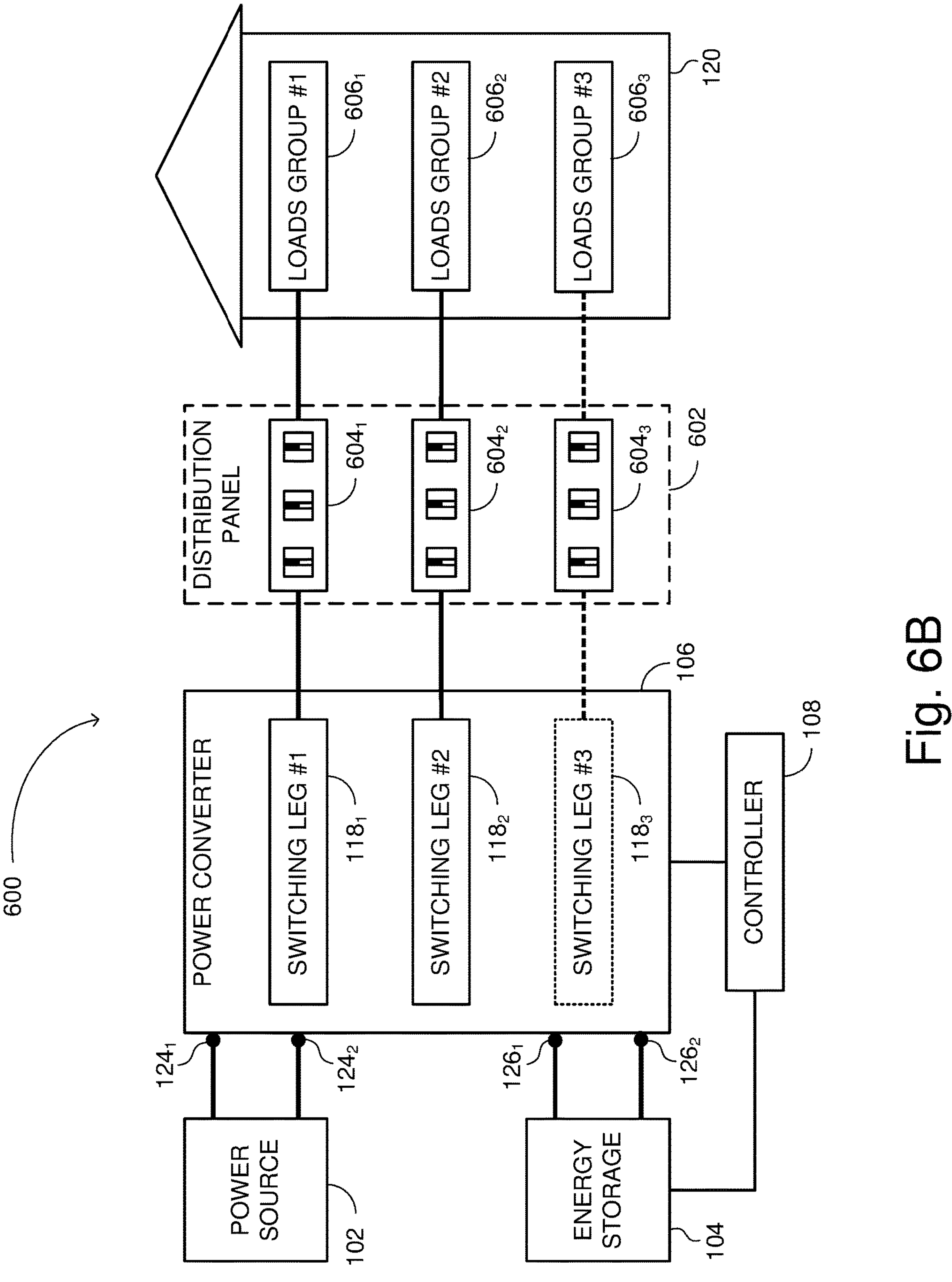
FIG. 6B illustrates the power system of FIG. 6A in accordance with aspects of the disclosure herein in which one switching legs is disabled based on priority of loads connected to the switching legs.
Figure 6C:
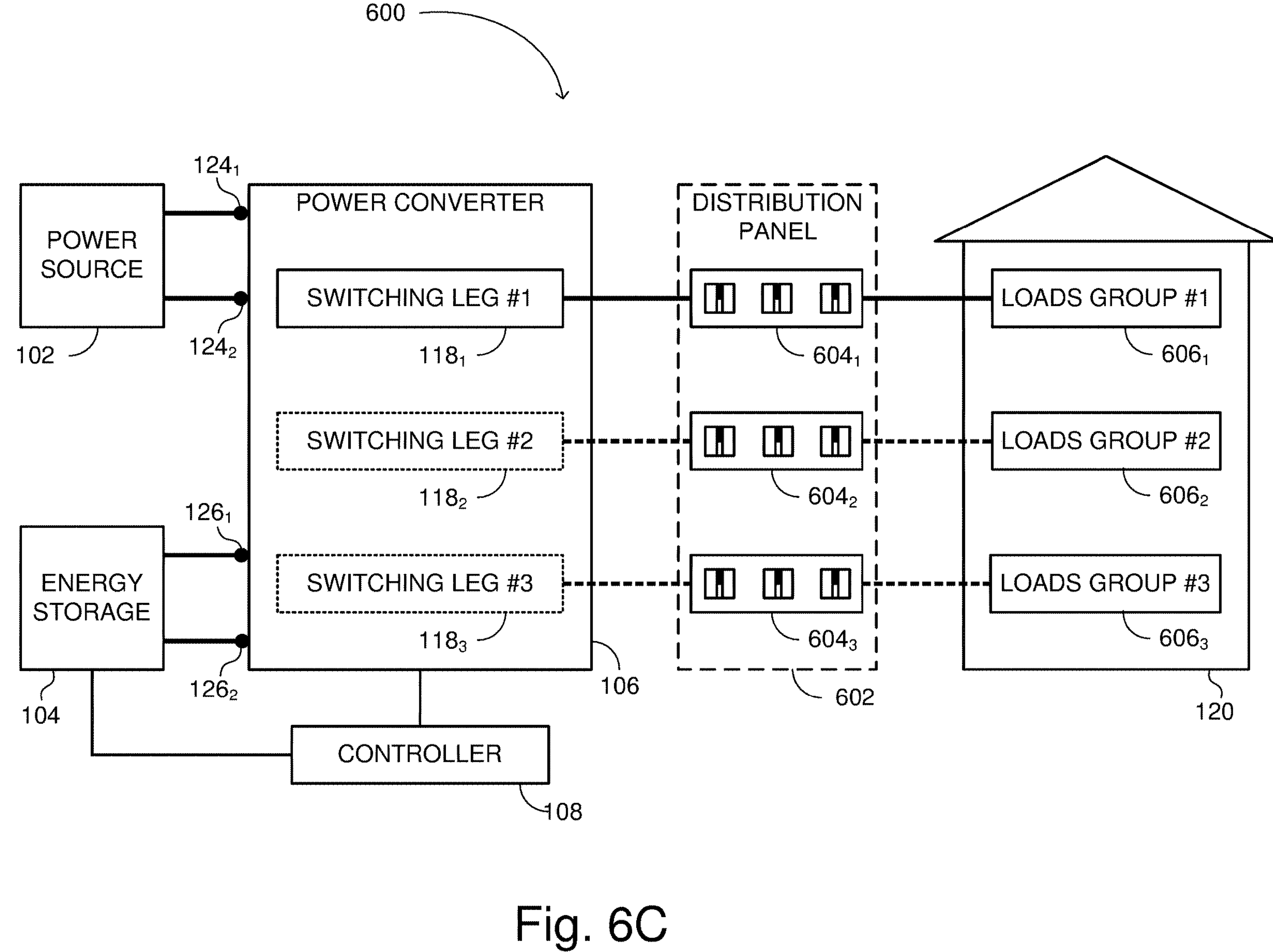
FIG. 6C illustrates the power system of FIG. 6A in accordance with aspects of the disclosure herein in which two switching legs are disabled based on priority of loads connected to the switching legs.

Switching legs of a power converter may be disabled based on a priority of loads connected to the switching leg (e.g., the selection criteria includes the priority of load connected to the switching leg). Reference is now made to FIGS. 6A, 6B, and 6C, which illustrate an example power system, generally referenced 600, in accordance with aspects of the disclosure herein. Power system 600 may be similar to power system 100 (FIGS. 1A-1D), and the same or similar elements are labeled with the same reference numbers. Power system 600 may further comprise a distribution panel 602. Distribution panel may comprise groups of switches $604_1$, $604_2$, and $604_3$. Each of switching legs $118_1$, $118_2$, and $118_3$ may be connected to a respective one of groups of switches $604_1$, $604_2$, and $604_3$. Each group of switches $604_1$, $604_2$, and $604_3$ may be connected to a respective group of loads $606_1$, $606_2$, and $606_3$. The loads of group of loads $606_1$, $606_2$, and $606_3$ may be grouped based on a priority or priorities of the loads. For example, the loads in group of loads $606_1$ may have the highest priority, the loads in group of loads $606_2$ may have the second highest priority, and the loads in group of loads $606_3$ may have the lowest priority or third-highest priority.

As depicted in FIGS. 6A-6C, power system 600 may not be connected to a power distribution network (however, power system 600 may be connected to a power distribution network, if desired). Based on a determination by controller 108 that power source 102 and/or energy storage 104 cannot produce sufficient power to support all the loads in group of loads $606_1$, $606_2$, and $606_3$, controller 108 may select and disable one or more of switching legs $118_1$, $118_2$, and $118_3$ based on the priority of group of loads $606_1$, $606_2$, and $606_3$. For example, with reference to FIG. 6B, the power produced by power source 102 or by energy storage 104 may be reduced. Based on this, controller 108 may determine to disable one or more switching legs, and may select switching leg $118_3$ to be disabled. Thus, group of loads $604_3$ may not receive power from power converter 106 while switching leg $118_3$ is disabled. With reference to FIG. 6C, the power produced by power source 102 or by energy storage 104 may reduce further. Controller 108 selects to disable switching leg $118_2$ as well. Thus, group of loads $604_3$ and group of loads $604_2$ may not receive power from power converter 106. Thus, loads may be disconnected based on priority in case the power produced by power source 102 or by energy storage 104 is not sufficient for all the loads.

Figure 7A:
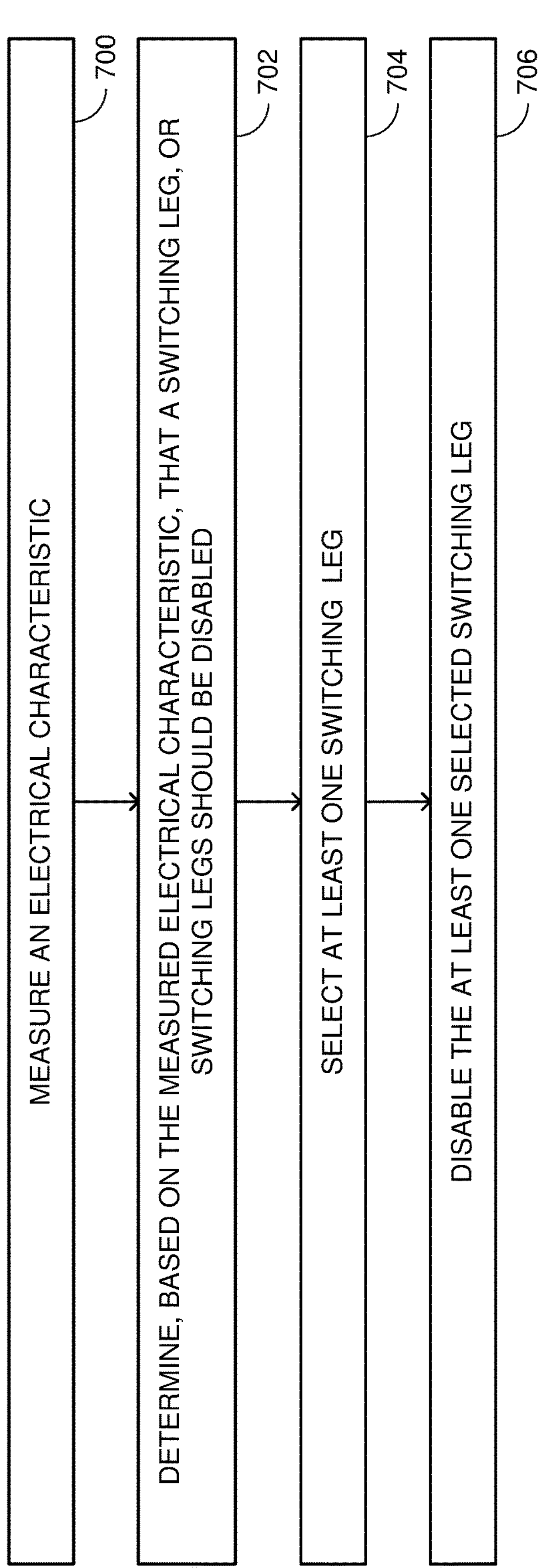
FIG. 7A illustrates a flowchart depicting an example method for switching legs selection based on a measured electrical characteristic.

Reference is now made to FIGS. 7A, 7B, 7C, 7D and 7E, which show example methods according to aspects of the disclosure herein. In particular, FIG. 7A shows an example method, and FIGS. 7B-7E show various example implementations of the method in FIG. 7A. With reference to FIG. 7A, in step 700 a sensor or sensors (e.g., as may be shown by sensor(s) 110—FIG. 1D), may measure an electrical characteristic relating to a power system (e.g., power system 100—FIGS. 1A-ID, power system 200—FIGS. 2A-2C, power system 400—FIG. 4, power system 500—FIG. 5, or power system 600—FIG. 6). For example the sensors 110 may measure any one, some, or all of the following electrical characteristics: output voltage (e.g., line-to-line voltage, line-to-neutral voltage), output current, output power, frequency, input voltage, input current, and/or input power. For example, sensor(s) 110 may measure one or more of the voltage, current, and/or frequency at one or more of AC terminals $128_1$, $128_2$, and/or $128_3$. For example sensor(s) 110 may measure one or more of the voltage and/or current at one or more of first DC terminals 124; and/or $124_2$, and/or second Dc terminals $126_1$ and/or $126_2$.

In step 702 a controller (e.g., controller 108—FIGS. 1A-ID, 2A-2C, or 6, controller 408—FIG. 4, or one of controllers 508—FIG. 5) may determine that a switching leg or switching legs of a plurality of switching legs (e.g., one or more of switching legs $118_1$, $118_2$, and/or $118_3$—FIGS. 1A-1D, 2A-2C, or 6) should be disabled. The determination that a switching leg or switching legs should be disabled may be based on various parameters such as a measured electrical characteristic or characteristics, power drawn by a load, power produced by a power source, or power stored in an energy storage. Examples of these various parameters are shown in FIGS. 7B-7E below.

In step 704, the controller may, based on the determination at step 702 that one or more of the switching legs should be disabled, select a switching leg or multiple switching legs (e.g., one or more of switching legs $118_1$, $118_2$, and/or $118_3$—FIGS. 1A-ID, 2A-2C, or 6). The controller may select the switching leg or switching legs based on a selection criteria. For example, the controller may randomly select a switching leg or switching legs (e.g., pseudo-randomly, or based on a distribution function) or based on a predetermined sequence. The controller may additionally or alternatively select the switching leg or switching legs based on one or more switching legs that are disabled (or that have been selected to be disabled) in one or more other power systems, and/or based on a signal or signals from a power company (e.g., as described in conjunction with FIG. 5 or FIG. 6). The controller may additionally or alternatively select the switching leg or switching legs based on a second measured electrical characteristic. For example, sensor(s) 110 (FIGS. 1A-ID, 2A-2C, or 6) may measure a frequency of the power at one or more of AC terminals $\mathbf{128}_1$, $\mathbf{128}_2$, or $\mathbf{128}_3$ (FIGS. 1A-ID, 2A-2C, or 6). In case the frequency of the power at one or more of AC terminals $\mathbf{128}_1$, $\mathbf{128}_2$, or $\mathbf{128}_3$, is lower than a frequency threshold, the controller may select to disable one or more of switching legs $\mathbf{118}_1$, $\mathbf{118}_2$, or $\mathbf{118}_3$, which do not correspond to the AC terminal or AC terminals having a measured frequency lower than the frequency threshold.

In step 706, the controller may disable the switching leg or switching legs that were selected in step 704. The controller may disable the selected switching leg or switching legs by controlling one or more of the switches in the selected switching leg or switching legs to be in a non-conducting state (e.g., as shown in FIGS. 1A-1C). As a further example, the controller may disable the selected switching leg or switching legs by controlling a disabling a switch (e.g., as may be shown by switches $\mathbf{202}_1$, $\mathbf{202}_2$, or $\mathbf{202}_3$—FIGS. 2A-2C) connected between the switching leg and a respective terminal (e.g., as may be shown by AC terminals $\mathbf{128}_1$, $\mathbf{128}_2$, or $\mathbf{128}_3$—FIGS. 1A-1D, 2A-2C) of the power converter (e.g., as may be shown by power converter 106—FIGS. 1A-ID, 2A-2C) to be in a non-conducting state.

Figure 7B:
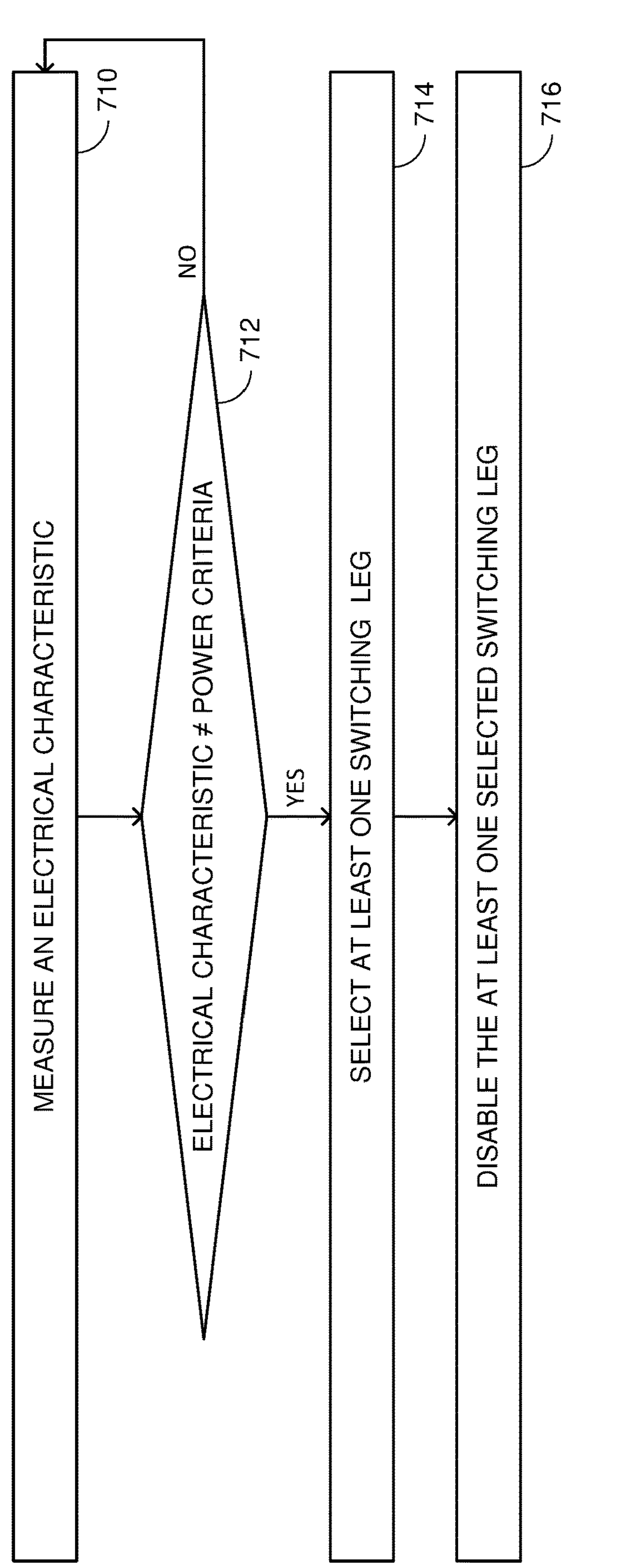
FIG. 7B illustrates a flowchart depicting an example implementation of the method of FIG. 7A for switching legs selection based on a measured electrical characteristic.

Reference is made to FIG. 7B, which as mentioned above shows an example implementation of the method of FIG. 7A, and in which the determination to disable a switching leg or switching legs of a plurality of switching legs is based on a measured electrical characteristic. In step 710 a sensor or sensors (e.g., as may be shown by sensor(s) 110—FIG. 1D), may measure an electrical characteristic relating to a power system (such as the power system referenced with respect to FIG. 7A). For example the sensors 110 may measure any one, some, or all of the following electrical characteristics: output voltage (e.g., line-to-line voltage, line-to-neutral voltage), output current, output power, frequency, input voltage, input current, and/or input power. For example, sensor(s) 110 may measure one or more of the voltage, current, and/or frequency at one or more of AC terminals $\mathbf{128}_1$, $\mathbf{128}_2$, and/or $\mathbf{128}_3$. For example sensor(s) 110 may measure one or more of the voltage and/or current at one or more of first DC terminals $\mathbf{124}_1$ and/or $\mathbf{124}_2$, and/or second Dc terminals $\mathbf{126}_1$ and/or $\mathbf{126}_2$.

In step 712, the controller may compare the electrical characteristic with one or more criteria. For example, the controller may determine that the output current is lower than a threshold output current. For example, the controller may determine that the input voltage is lower than a threshold input voltage. Other examples include determining that an input power is lower than a threshold input power and/or that an output power is lower than a threshold output power. The one or more criteria may comprise a single threshold or comprise multiple thresholds of the same or different electrical characteristics. For example, the controller may determine both that the output voltage is below an output voltage threshold and that the output current is below an output current threshold. The result of this comparison indicates to the controller if a switching leg or switching legs should be disabled. If it is determined by the controller that the one or more electrical characteristics each do not satisfy the one or more criteria (e.g., each one or more measured electrical characteristic is not below a corresponding threshold for the measured electrical characteristic), the method returns to step 710. If it is determined by the controller that the electrical characteristic satisfies the one or more criteria (e.g., each one or more measured characteristic is below the corresponding threshold for the measured electrical characteristic), the method proceeds to step 714.

In step 714, the controller may, based on the determination at step 712 that one or more of the switching legs should be disabled, select a switching leg or multiple switching legs (e.g., one or more of switching legs $\mathbf{118}_1$, $\mathbf{118}_2$, and/or $\mathbf{118}_3$—FIGS. 1A-1D, 2A-2C, or 6). The controller may select the switching leg or switching legs based on a selection criteria. For example, the controller randomly select a switching leg or switching legs (e.g., pseudo-randomly, or based on a distribution function) or based on a predetermined sequence. The controller may additionally or alternatively select the switching leg or switching legs based on switching legs selected in one or more other power systems, and/or based on a signal or signals from a power company (e.g., as described in conjunction with FIG. 5 or FIG. 6). The controller may additionally or alternatively select the switching leg or switching legs based on a second measured electrical characteristic. For example, sensor(s) 110 (FIGS. 1A-1D, 2A-2C, or 6) may measure a frequency of the power at one or more of AC terminals $\mathbf{128}_1$, $\mathbf{128}_2$, or $\mathbf{128}_3$ (FIGS. 1A-1D, 2A-2C, or 6). In case the frequency of the power at one or more of AC terminals $\mathbf{128}_1$, $\mathbf{128}_2$, or $\mathbf{128}_3$, is lower than a frequency threshold, the controller select not disable corresponding one of switching legs $\mathbf{118}_1$, $\mathbf{118}_2$, or $\mathbf{118}_3$.

In step 718, the controller may disable the selected switching leg or switching legs. The controller may disable the selected switching leg or switching legs by controlling one or more of the switches in the selected switching leg or switching legs to be in a non-conducting state (e.g., as shown in FIGS. 1A-1C). As a further example, the controller may disable the selected switching leg or switching legs by controlling a disabling a switch (e.g., as may be shown by switches $\mathbf{202}_1$, $\mathbf{202}_2$, or $\mathbf{202}_3$—FIGS. 2A-2C) connected between the switching leg and a respective terminal (e.g., as may be shown by AC terminals $\mathbf{128}_1$, $\mathbf{128}_2$, or $\mathbf{128}_3$—FIGS. 1A-1D, 2A-2C) of the power converter (e.g., as may be shown by power converter 106—FIGS. 1A-1D, 2A-2C) to be in a non-conducting state.

Figure 7C:
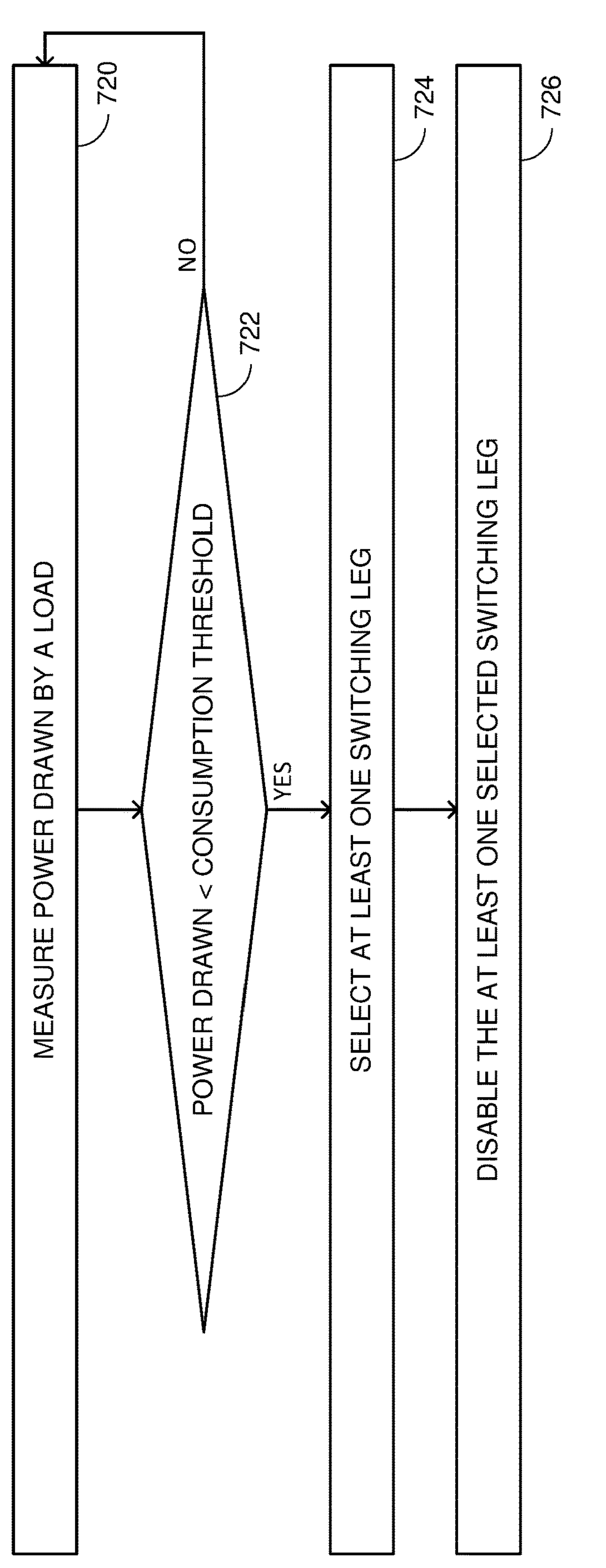
FIG. 7C illustrates a flowchart depicting an example implementation of the method of FIG. 7A for switching legs selection, in which the measured electrical characteristic comprises an amount of power consumption of a load connected to a DC-AC power converter.

FIG. 7C shows an example implementation of the method of FIG. 7A, in which the measured characteristic comprises measured power drawn by a load (e.g., as may be shown by load 120—FIGS. 1A-1D, 2A-2C, or 6). With reference to FIG. 7C, in step 720 a sensor or sensors (e.g., as may be shown by sensor(s) 110—FIG. 1D), may measure the power drawn by the load. For example the sensors may measure output voltage and output current. A controller (e.g., the controller that performed various steps in FIG. 7A) may determine the power drawn by the load based on the measured output voltage and output current. The sensor or sensors may measure the output power directly.

In step 722, the controller may determine if the power drawn by the load is lower than a consumption threshold. The result of this comparison indicates to the controller if a switching leg or switching legs should be disabled. If the controller determines that the power drawn is higher than the consumption threshold, the method returns to step 720. If the controller determines that the power drawn is lower than the consumption threshold, the method proceeds to step 724.

In step 724, the controller may select, based on the determination at step 722 that one or more of the switching legs should be disabled, a switching leg or switching legs (e.g., similar to as described above in conjunction with FIGS. 1A-1D, 4, 5, or 7A) to be disabled.

In step 726, the controller may disable the selected switching leg or switching legs. (e.g., similar to as described above in conjunction with FIGS. 1A-1D, 2A-2C, or 7A).

Figure 7D:
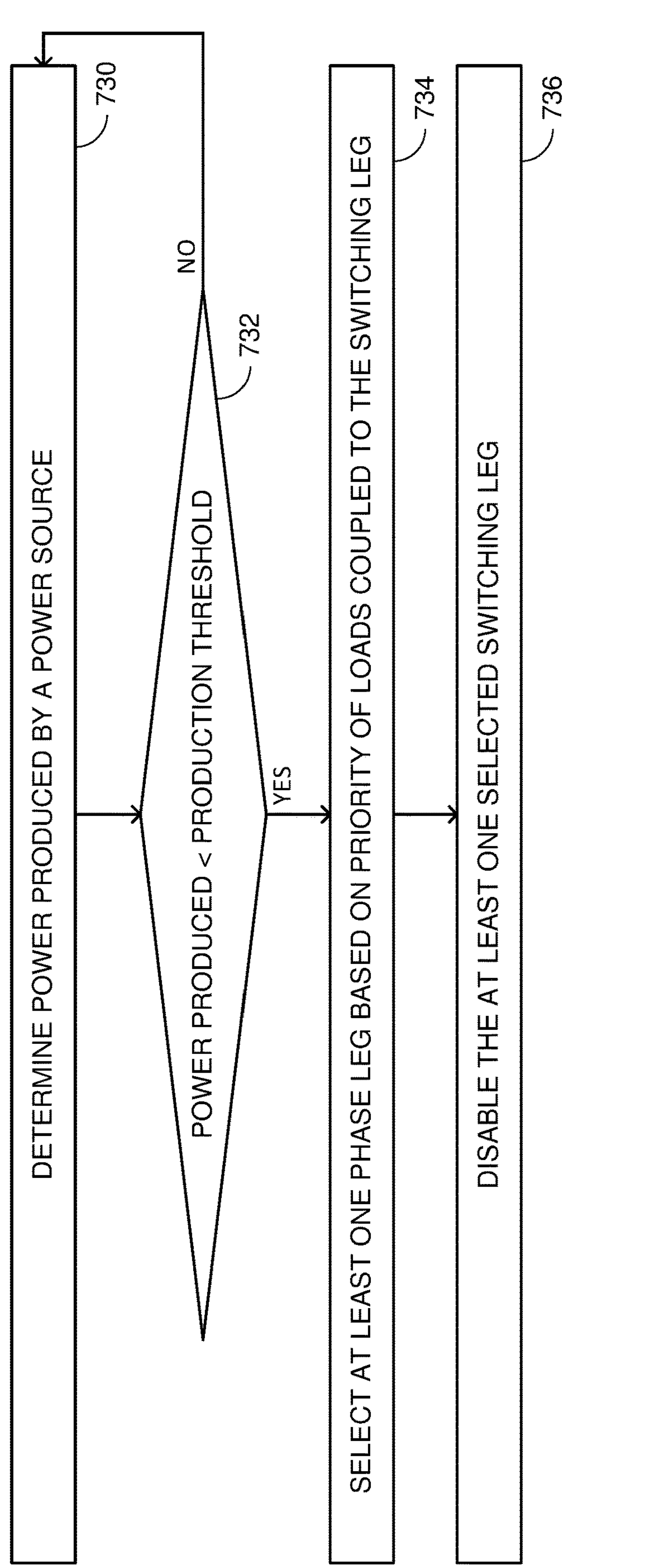
FIG. 7D illustrates a flowchart depicting an example implementation of the method of FIG. 7A for switching legs selection, in which the measured electrical characteristic comprises an amount of power produced by a power source and/or an energy storage.

FIG. 7D shows an example implementation of the method of FIG. 7A, in which the measured characteristic comprises measured power produced by a power source (e.g., power source 102—FIGS. 1A-1D, 2A-2C, or 6). With reference to FIG. 7D, in step 730 a sensor or sensors (e.g., as may be shown by sensor(s) 110—FIG. 1D), may measure the power produced by the power source. For example the sensors may measure voltage and current produced by the power source. The sensor or sensors may measure the input power directly.

In step 732, a controller (e.g., the controller that performed various steps of FIG. 7A) may determine if the power produced by the power source is lower than a production threshold. The result of this comparison indicates to the controller if a switching leg or switching legs should be disabled. If the controller determines that the power produced is higher than the production threshold, the method returns to step 730. If the controller determines that the power produced is lower than the production threshold, the method proceeds to step 734.

In step 734, the controller may select, based on the determination at step 732 that one or more of the switching legs should be disabled, a switching leg or switching legs (e.g., similar to as described above in conjunction with FIGS. 1A-1D, 4, 5, or 7A).

In step 736, the controller may disable the selected switching leg or switching legs. (e.g., similar to as described above in conjunction with FIGS. 1A-1D, 2A-2C, or 7A).

Figure 7E:
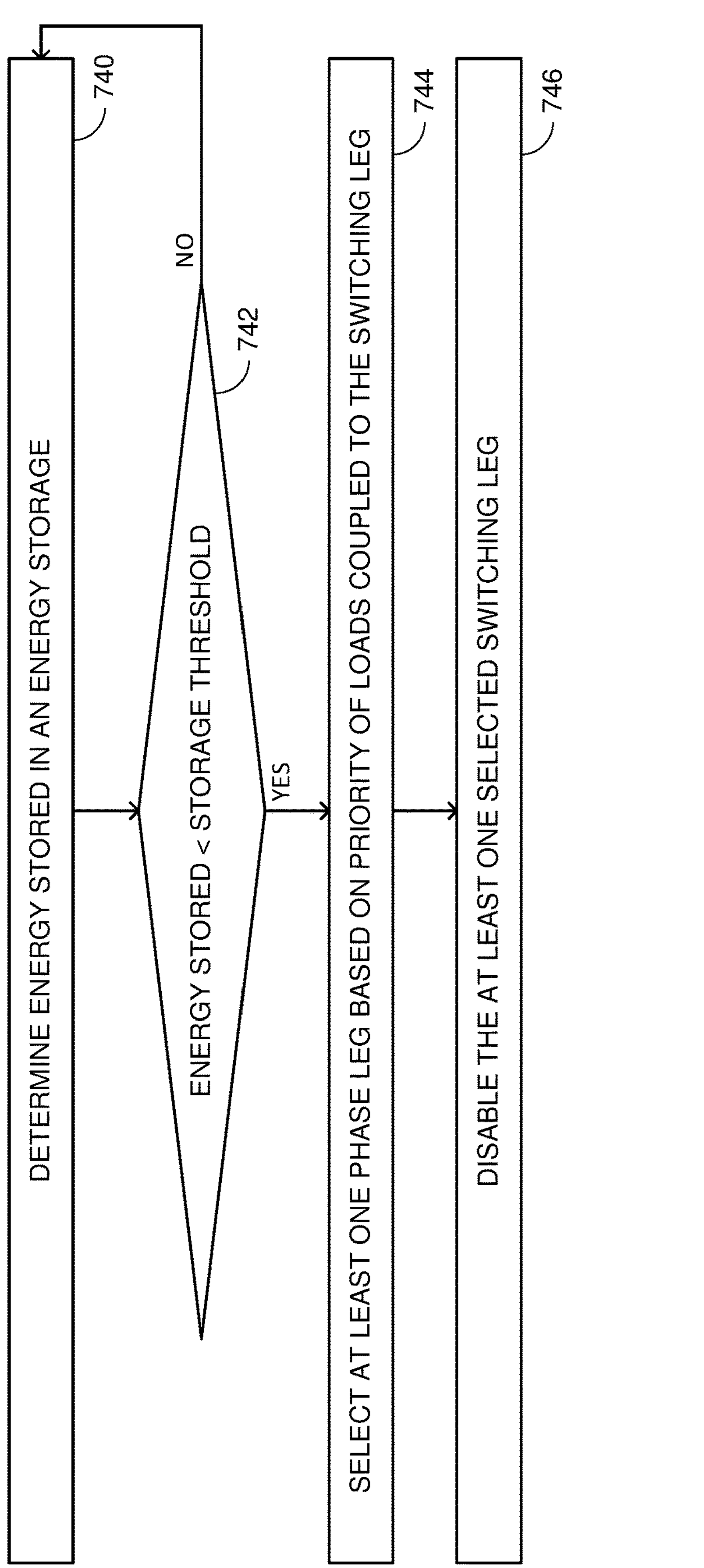
FIG. 7E illustrates a flowchart depicting an example implementation of the method of FIG. 7A for switching legs selection, in which the measured electrical characteristic comprises an amount of energy produced by a power source.

FIG. 7E shows an example implementation of the method of FIG. 7A, in which the measured characteristic comprises measured power stored in a power storage (e.g., power storage 104—FIGS. 1A-1D, 2A-2C, or 6). With reference to FIG. 7E, in step 740 a sensor or sensors (e.g., as may be shown by sensor(s) 110—FIG. 1D), may measure one or more electrical characteristics relating to energy stored in the power storage. For example, the sensors may measure voltage and/or current input to and/or output from the power storage. The controller may calculate power that is input to and/or output from the power storage based on the measured voltage and current, and may integrate, over time, the calculated power output to and/or from the power storage to calculate and track (e.g., estimate) the energy that is stored in the power storage.

In step 742, a controller (e.g., the controller that performed various steps of FIG. 7A) may determine if the energy stored by the power storage is lower than a storage threshold (for example a threshold of a certain amount of energy such as a certain amount of kilowatt-hours, or a percentage of maximum storage capacity). The result of this comparison indicates to the controller if a switching leg or switching legs should be disabled. If the controller determines that the energy stored is higher than the storage threshold, the method returns to step 740. If the controller determines that the energy stored is lower than the storage threshold, the method proceeds to step 744.

In step 744, the controller may select, based on the determination in step 742 that one or more of the switching legs should be disabled, a switching leg or switching legs (e.g., similar to as described above in conjunction with FIGS. 1A-1D, 4, 5, or 7A).

In step 746, the controller may disable the selected switching leg or switching legs. (e.g., similar to as described above in conjunction with FIGS. 1A-1D, 2A-2C, or 7A).

One or more aspects of the disclosure may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
- a power converter comprising:
  - direct current (DC) terminals configured to receive input power from a power source;
  - a plurality of alternating current (AC) terminals; and
  - a plurality of switching legs comprising:
    - a first switching leg comprising a plurality of switches and connected to the DC terminals and to a first AC terminal of the plurality of AC terminals;
    - a second switching leg comprising a plurality of switches and connected to the DC terminals and to a second AC terminal of the plurality of AC terminals; and
    - a third switching leg comprising a plurality of switches and connected to the DC terminals and to a third AC terminal of the plurality of AC terminals; and
- a controller configured to:
  - determine, based on based on a comparison of a measured electrical characteristic with a load power consumption threshold, to disable one or more switching legs of the plurality of switching legs;
  - select at least one switching leg of the plurality of switching legs, based on as selection criteria and based on a determination that power drawn by a load, connected to one or more terminals of the plurality of AC terminals, is below the load power consumption threshold; and
  - cause the selected at least one switching leg to be disabled.

2. The system of claim 1, further comprising a plurality of terminals configured to be connected to an energy storage, wherein the controller is configured to cause the energy storage to provide power to the power converter based on the input power and based on a consumption of the load.

3. The system of claim 1, further comprising a sensor corresponding to one of the plurality of AC terminals, wherein the controller is configured to receive, from the sensor, an indication of the measured electrical characteristic.

4. The system of claim 3, wherein the measured electrical characteristic corresponds to each of the plurality of AC terminals.

5. The system of claim 1, wherein the measured electrical characteristic comprises one or more of voltage, current, power or frequency.

6. The system of claim 1, wherein the selection criteria comprises at least one of:

random selection of the at least one switching leg;

selection of the at least one switching leg of the plurality of switching legs, for each of a plurality of time intervals;

selection of the at least one switching leg of the plurality of switching legs randomly, for each of a plurality of time intervals;

selection of at least one switching leg of the plurality of switching legs, for each of a plurality of time intervals and based on a predetermined sequence;

selection of the at least one switching leg, based on a second measured electrical characteristic; or a priority of loads connected to the plurality of switching legs.

7. The system of claim 6, wherein the second measured electrical characteristic is one or more of power, current, voltage, or frequency.

8. The system of claim 1, wherein the selection criteria is based on a signal, and wherein the controller is further configured to receive the signal and to select the at least one switching leg based on the signal.

9. The system of claim 1, wherein the controller is configured to cause the selected at least one switching leg to be disabled by controlling one or more switches of the plurality of switches, of the selected at least one switching leg, to be in a non-conducting state.

10. The system of claim 1, wherein the power converter further comprises:

a first switch connected between the first switching leg and the first AC terminal;

a second switch connected between the second switching leg and the second AC terminal; and a third switch connected between the third switching leg and the third AC terminal, wherein the controller is configured to cause the selected at least one switching leg to be disabled by controlling at least one of the first switch, the second switch, or the third switch to disconnect the selected at least one switching leg from at least one corresponding AC terminal of the plurality of AC terminals.

11. The system of claim 1, wherein the controller is configured to be connected to a meter that is connected to phases of a multi-phase power delivery network, and wherein the plurality of AC terminals are configured to be connected to the multi-phase power delivery network.

12. The system of claim 11, wherein the controller is configured to receive, from the meter, an indication of the measured electrical characteristic, and wherein the measured electrical characteristic comprises an electrical characteristic of at least one phase of the multi-phase power delivery network.

13. A method comprising:

measuring a load power consumption based on power drawn by a load connected to one or more switching legs of a plurality of switching legs of a power converter, wherein the plurality of switching legs comprises at least three switching legs each corresponding to a different phase of alternating current voltage;

determining, by a controller, based on the load power consumption, to disable one or more switching legs of the plurality of switching legs;

selecting, based on a selection criteria and based on the load power consumption being below a load power consumption threshold, at least one switching leg from the plurality of switching legs; and disabling by the controller, the selected at least one switching leg.

14. The method of claim 13, wherein the selection criteria comprises at least one of:

random selection of the at least one switching leg;

random selection of the at least one switching leg for each of a plurality of time intervals;

random selection of the at least one switching leg for each of a plurality of time intervals;

selection of the at least one switching leg comprises for each of a plurality of time intervals and based on a predetermined sequence; or a priority of loads connected to the switching legs.

15. The method of claim 13, wherein the selection criteria comprises selection of the at least one switching leg based on a signal, relating to a switching leg selection, received by the controller.

16. The method of claim 15, wherein the signal relating to the switching leg selection comprises an indication relating to disabling at least one switching leg.

17. The method of claim 16, wherein the signal relating to the switching leg selection comprises an indication of a power load on each of a plurality of phases of a power delivery network.

* * * * *